United States Patent
Munakata et al.

(10) Patent No.: US 10,216,292 B2
(45) Date of Patent: Feb. 26, 2019

(54) POSITION POINTER AND SIGNAL PROCESSOR

(71) Applicant: Wacom Co., Ltd., Saitama (JP)

(72) Inventors: Hiroshi Munakata, Saitama (JP); Takashi Suzuki, Tokyo (JP); Hideyuki Hara, Tokyo (JP); Yoshihisa Sugiyama, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 14/919,604

(22) Filed: Oct. 21, 2015

(65) Prior Publication Data
US 2016/0188016 A1   Jun. 30, 2016

(30) Foreign Application Priority Data
Dec. 26, 2014 (JP) ................. 2014-266476

(51) Int. Cl.
| G06F 3/0354 | (2013.01) |
| G06F 3/041 | (2006.01) |
| G06F 3/044 | (2006.01) |
| G06F 3/046 | (2006.01) |

(52) U.S. Cl.
CPC .......... G06F 3/03545 (2013.01); G06F 3/044 (2013.01); G06F 3/046 (2013.01); G06F 3/0416 (2013.01)

(58) Field of Classification Search
CPC .... G06F 3/03545; G06F 3/0416; G06F 3/044; G06F 3/046
See application file for complete search history.

(56) References Cited

U.S. PATENT DOCUMENTS

| 8,487,891 B2 | 7/2013 | Oda et al. |
| 8,581,861 B2 | 11/2013 | Oda et al. |
| 8,587,534 B2 | 11/2013 | Oda et al. |
| 8,587,535 B2 | 11/2013 | Oda et al. |

(Continued)

FOREIGN PATENT DOCUMENTS

| EP | 2 696 268 A2 | 2/2014 |
| EP | 2 947 544 A2 | 11/2015 |

(Continued)

OTHER PUBLICATIONS

Extended European Search Report dated Apr. 25, 2016 for corresponding EP Application No. 15202356.0, 10 pages.

*Primary Examiner* — Amare Mengistu
*Assistant Examiner* — Jennifer L Zubajlo
(74) *Attorney, Agent, or Firm* — Seed IP Law Group LLP

(57) ABSTRACT

A position pointer includes a signal generation circuit, which generates at least one signal. The position pointer in operation transmits the at least one signal to a sensor of a position detector. The position pointer includes a first electrode arranged to protrude from one end portion of a pen-shaped housing along an axial center direction and a second electrode including at least three electrode pieces disposed near the first electrode in such a manner as to surround a central axis of the housing. The at least three electrode pieces are electrically isolated from each other. The position pointer has a signal supply control circuit, which, in operation, controls supply of signals to selectively supply the at least one signal to the second electrode that includes the at least three electrode pieces and to the first electrode.

18 Claims, 20 Drawing Sheets

(56) References Cited

U.S. PATENT DOCUMENTS

| | | | |
|---|---|---|---|
| 8,638,320 B2 * | 1/2014 | Harley | G06F 3/044 178/18.06 |
| 8,692,779 B2 | 4/2014 | Oda et al. | |
| 8,896,547 B2 | 11/2014 | Oda et al. | |
| 8,913,041 B2 | 12/2014 | Fukushima et al. | |
| 8,937,875 B2 | 1/2015 | Hoshino et al. | |
| 9,049,064 B2 | 6/2015 | Hoshino et al. | |
| 9,158,418 B2 | 10/2015 | Oda et al. | |
| 2010/0321313 A1 | 12/2010 | Oda et al. | |
| 2010/0321314 A1 | 12/2010 | Oda et al. | |
| 2010/0321315 A1 | 12/2010 | Oda et al. | |
| 2010/0321331 A1 | 12/2010 | Oda et al. | |
| 2010/0321332 A1 | 12/2010 | Oda et al. | |
| 2010/0321333 A1 | 12/2010 | Oda et al. | |
| 2010/0321334 A1 | 12/2010 | Oda et al. | |
| 2011/0219892 A1 | 9/2011 | Fukuishima et al. | |
| 2011/0317581 A1 | 12/2011 | Hoshino et al. | |
| 2012/0146940 A1 | 6/2012 | Yamamoto et al. | |
| 2012/0256830 A1 | 10/2012 | Oda et al. | |
| 2013/0088465 A1 * | 4/2013 | Geller | G06F 3/03545 345/179 |
| 2013/0106718 A1 * | 5/2013 | Sundara-Rajan | G06F 3/03545 345/173 |
| 2014/0043301 A1 * | 2/2014 | Katsurahira | G06F 3/044 345/179 |
| 2015/0078195 A1 | 3/2015 | Hoshino et al. | |
| 2015/0245331 A1 | 8/2015 | Hoshino et al. | |

FOREIGN PATENT DOCUMENTS

| | | |
|---|---|---|
| JP | 2011-3035 A | 1/2011 |
| JP | 2011-3036 A | 1/2011 |
| JP | 2011-186803 A | 9/2011 |
| JP | 2012-123599 A | 6/2012 |
| JP | 2013-049495 A | 3/2013 |
| JP | 2014-135747 A | 7/2014 |

* cited by examiner

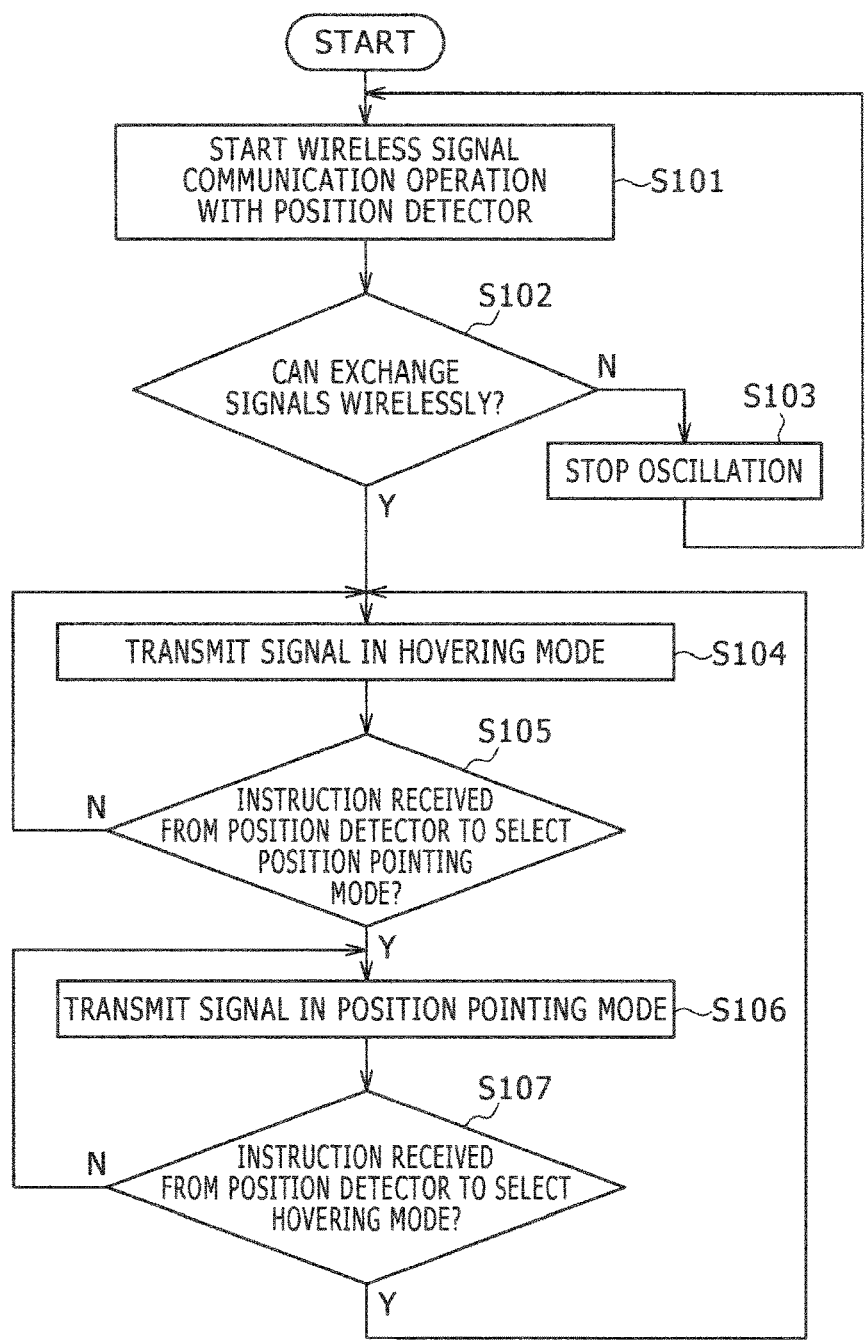

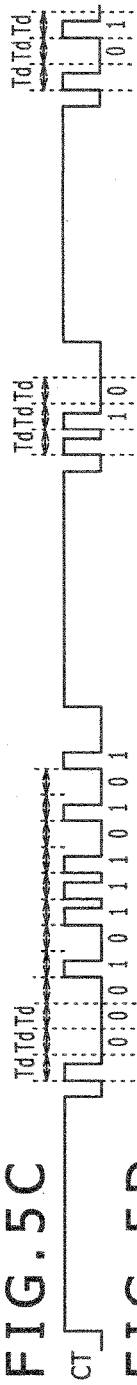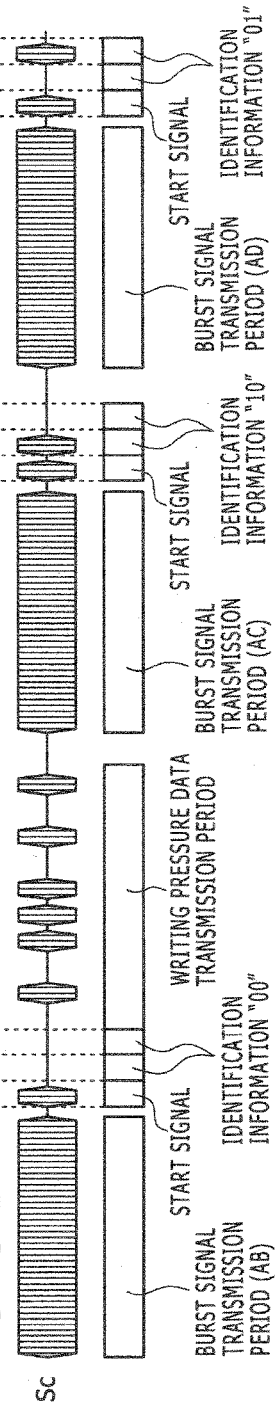

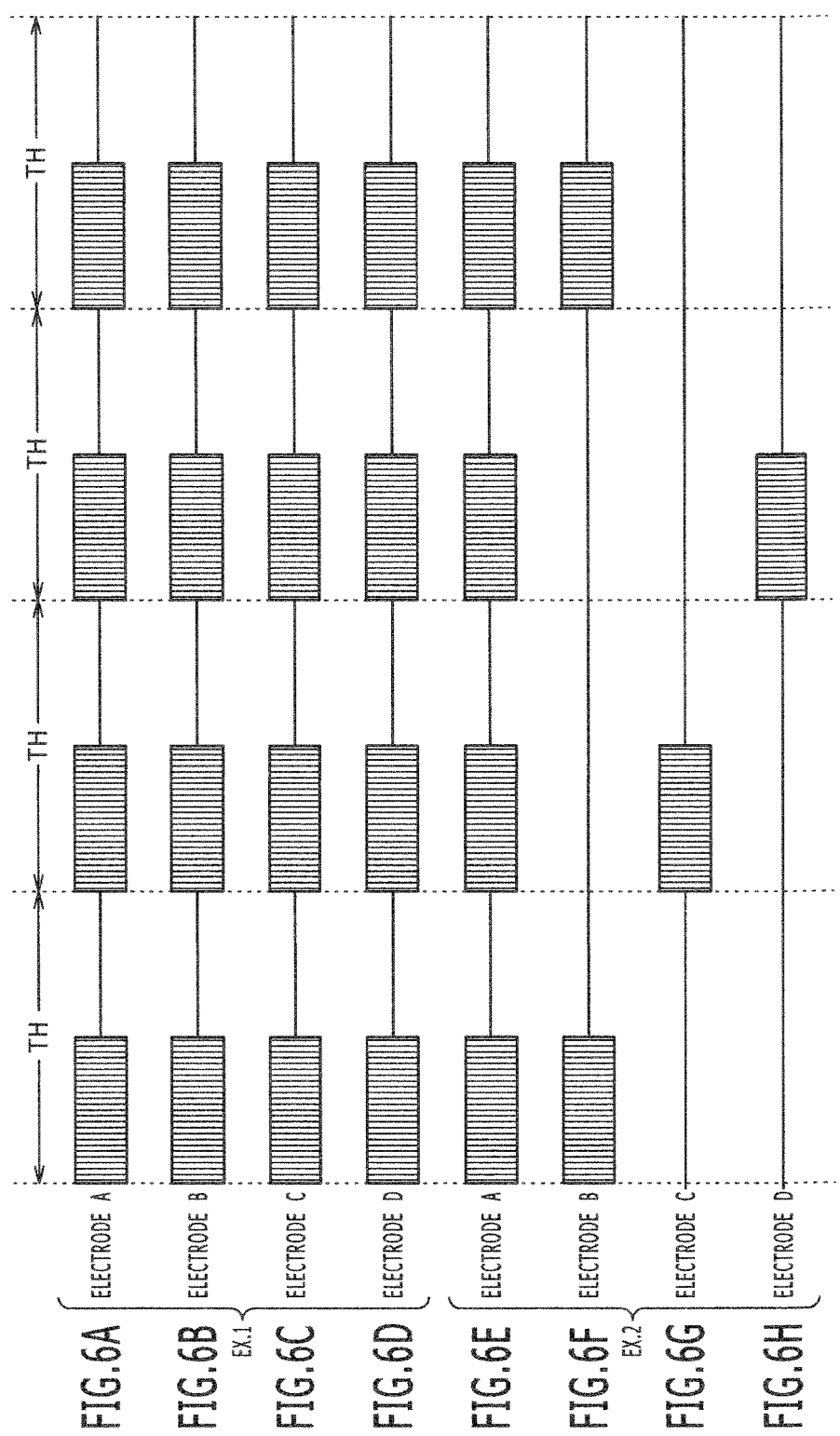

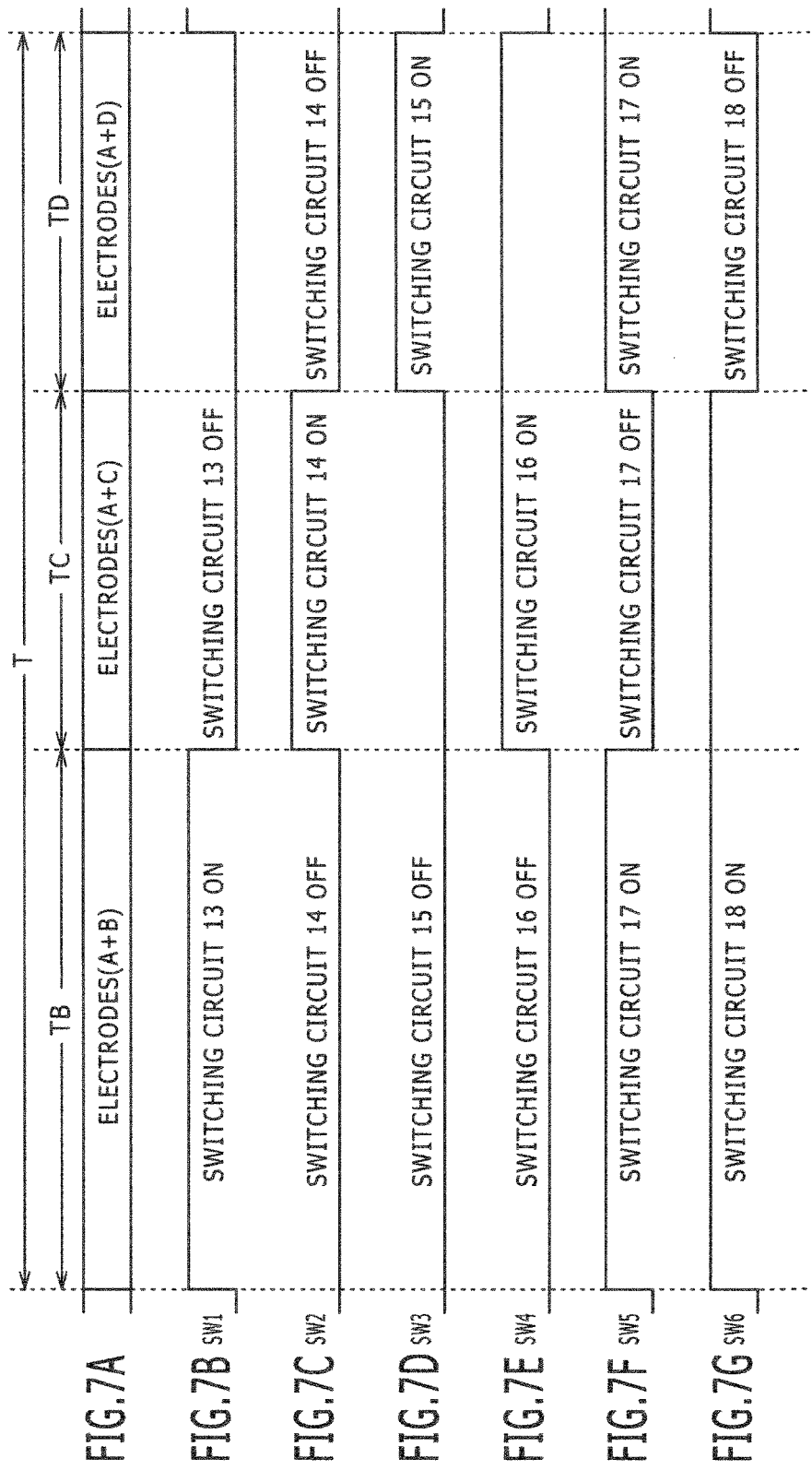

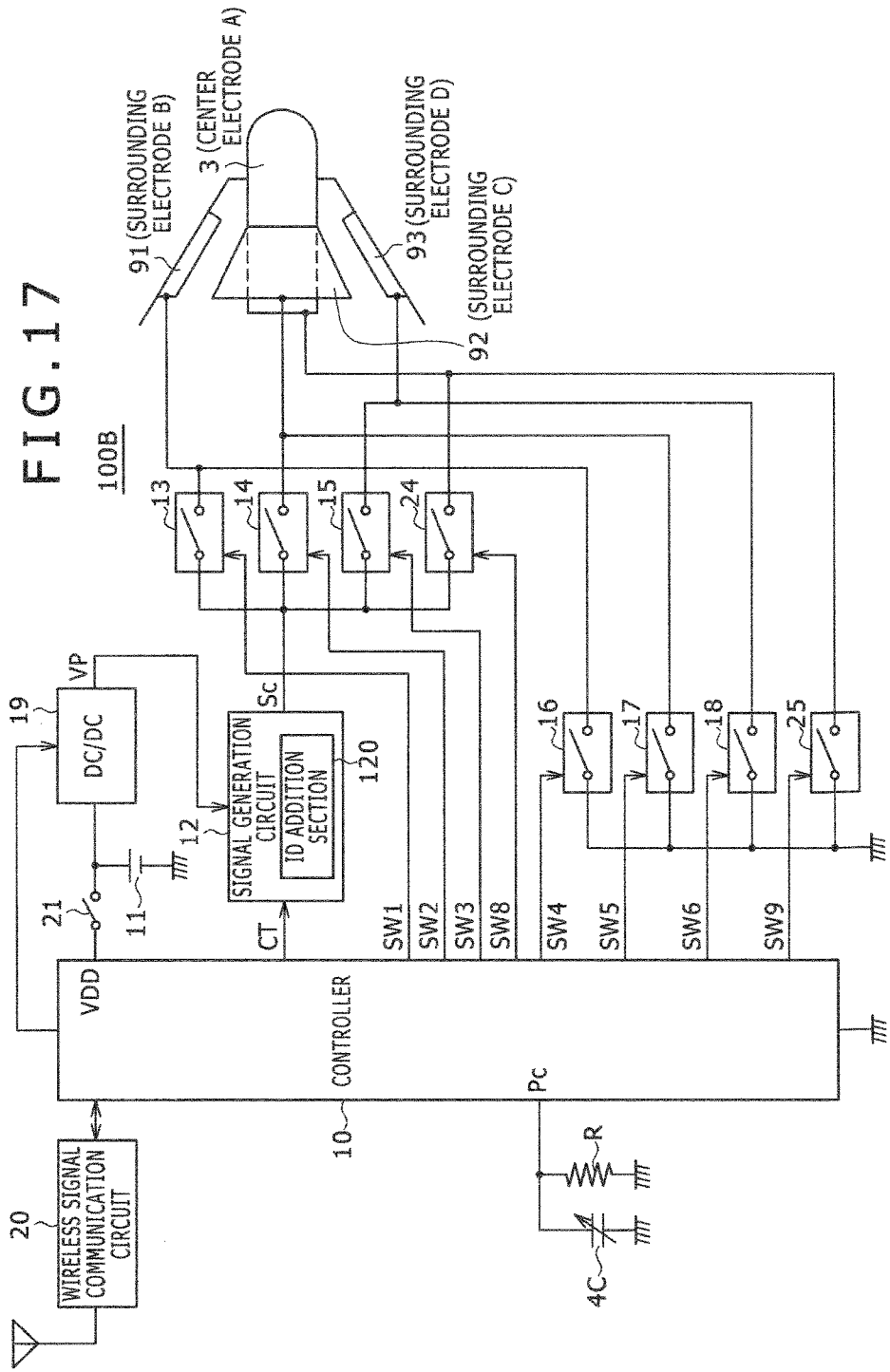

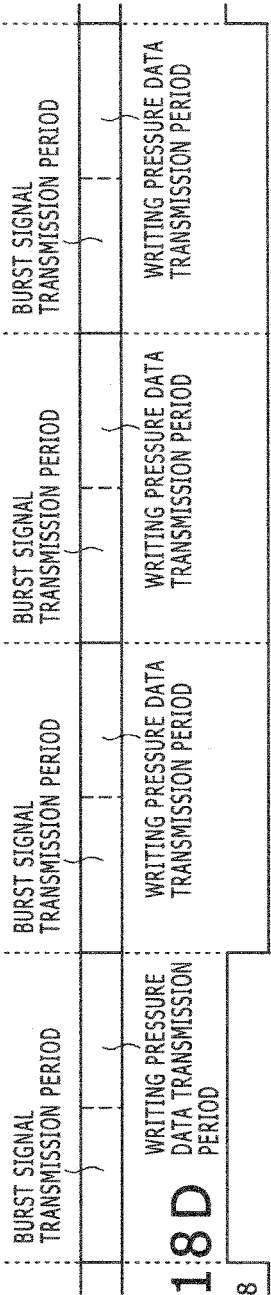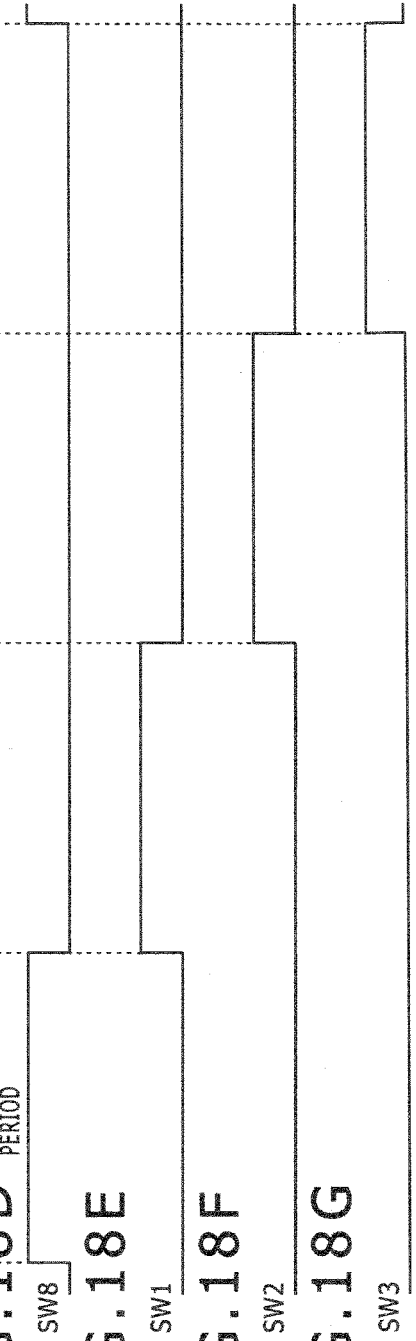

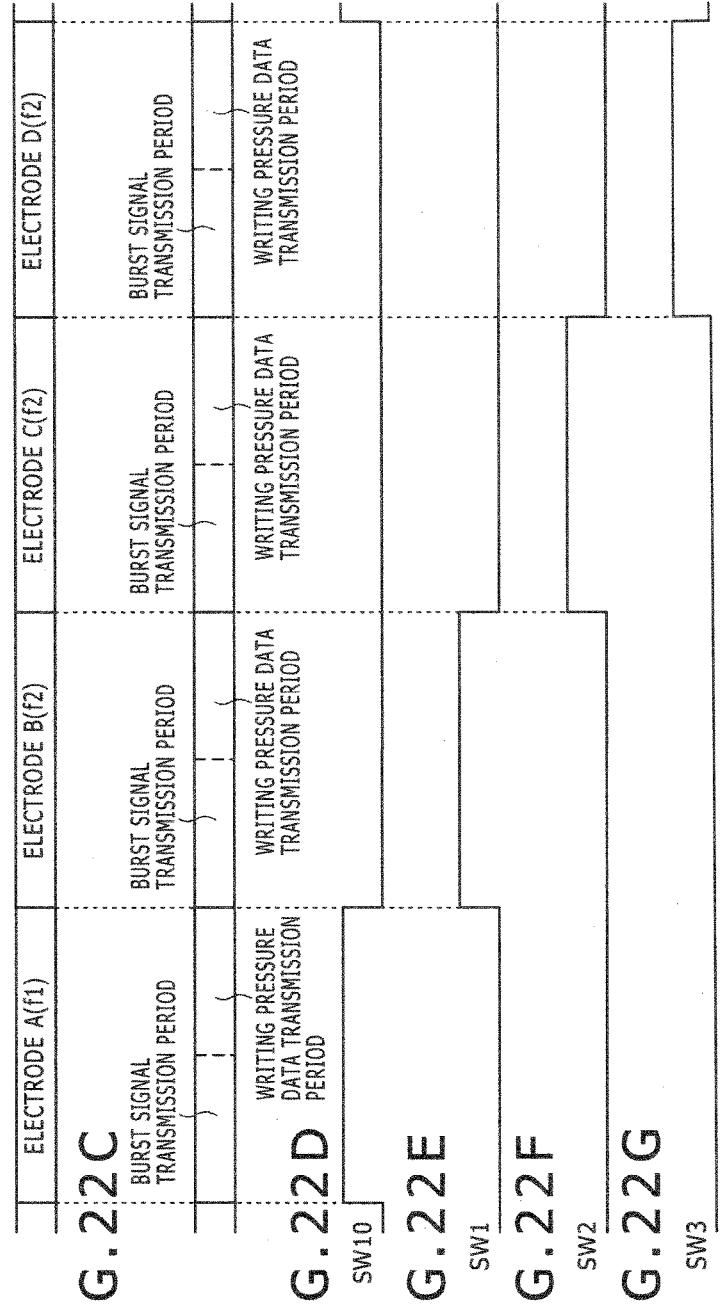

POSITION POINTER AND SIGNAL PROCESSOR

BACKGROUND

Technical Field

The present disclosure relates to a pen-shaped position pointer (stylus) and a signal processor for detecting a condition of the position pointer on a sensor that capacitively couples with the position pointer.

Description of the Related Art

A pen-shaped position detector is used, for example, to enter text and drawings. In this case, there is a demand to not only enter coordinate values as an input but also enter angular information such as rotation and tilt of the position pointer based, for example, on the manner in which the user twists his or her hand or on the personal habit as data.

To respond to this demand, disclosures have been proposed, for example, in Patent Document 1 (Japanese Patent Laid-Open No. 2014-35631) and Patent Document 2 (U.S. Pat. No. 8,638,320B2 specification) which are designed to detect the tilt angle of the position pointer on the sensor surface of the position detector or the rotation angle of the position pointer about the axis vertical to the sensor surface.

In Patent Document 1, first and second electrodes are provided on a core body to detect the rotation angle of the position pointer. The first and second electrodes are alternately selected to change the electrode from which to transmit an AC (alternating current) signal. At this time, signal transmission pattern information is included in the AC signal transmitted from the position pointer. The signal transmission pattern information indicates from which of the first and second electrodes the AC signal is transmitted. Then, the position detector calculates the rotation angle of the position pointer about the axis vertical to the sensor surface on the basis of a plurality of coordinate positions on the sensor surface on which the AC signal from the position pointer has been received. The coordinate positions are found in relation to pattern information received from the position pointer.

Further, in Patent Document 1, three electrodes are provided on a housing to detect the tilt angle of the position pointer so that the tip portion on one side of the housing surrounds the core body that protrudes from an opening of the housing. Moreover, a switching circuit is provided which supplies an AC signal to one of the electrodes selected on the basis of a predetermined pattern. Then, the position pointer transmits, to the position detector, pattern information indicating the pattern type when the pattern is changed by the switching circuit. Then, the position detector calculates the tilt angle of the position pointer relative to the sensor surface from at least three coordinate positions and three signal strengths that are obtained for at least three pieces of pattern information received.

Still further, in Patent Document 2, a signal is supplied to tip electrodes (414 and 714) and surrounding electrodes (ring electrode 416 and segment electrodes 716-A to 716-C) to detect the rotation and tilt angles of the position pointer (stylus) on the basis of signal reception patterns from the tip electrodes on the touch panel and signal reception patterns from the surrounding electrodes.

As described in the above Patent Documents 1 and 2, there is a demand for a capacitive coupling position pointer which is designed to point a position on the sensor by capacitively coupling with the sensor of the position detector to be able to detect a rotation condition (rotation angle) of the position pointer itself on the sensor surface and the tilt angle of the position pointer relative to the sensor surface. Then, recent years have seen a demand for this type of capacitive coupling position pointer to go beyond basic capabilities such as detecting the position pointed to when the tip of the core body (electrode) comes in contact with the sensor surface and to be able to detect the position pointed to by the position pointer when the tip of the core body (electrode) of the position pointer is in so-called hovering condition in which the tip of the core body is away from the sensor surface.

In the position pointer described in Patent Document 1, however, when the tip of the core body is away from the sensor surface of the position detector, that is, in a so-called hovering condition, the first and second electrodes provided on the core body are not used. Signals are transmitted to the sensor from the three electrodes provided to surround the core body. As a result, signals are not necessarily transmitted from the position pointer to the sensor in an efficient manner. Therefore, it is difficult for the position detector to detect the position pointer that is away from and is hovering over the sensor surface with high sensitivity.

In the case of the position pointer described in Patent Document 2, signals are transmitted not only from the surrounding electrodes but also from the tip electrodes, thus allowing for highly efficient transmission of signals from the position detector to the sensor. In the position pointer described in Patent Document 2, however, a signal is always transmitted to the sensor from the tip electrodes and all of the surrounding electrodes irrespective of whether the position pointer is in contact with or hovers over the sensor surface, thus resulting in large power consumption. This type of position pointer is battery-driven. Therefore, the power consumption problem is important.

BRIEF SUMMARY

In view of the problems described above, it is desirable to provide a position pointer that meets advanced functional demands such as detecting the tilt and rotation angles and detecting the hovering condition with high sensitivity in consideration of long hours of operation or low power consumption. It is also desirable to provide a signal processor that can detect angular information of the position pointer on the sensor such as tilt and rotation and detect the condition of the position pointer as to whether or not the position pointer is hovering with high efficiency and high sensitivity.

According to an embodiment of the present disclosure, there is provided a position pointer. The position pointer has a signal generation circuit inside a pen-shaped housing. The signal generation circuit generates a given signal. The position pointer transmits the signal generated by the signal generation circuit to a sensor of a position detector.

The position pointer includes first and second electrodes and a signal supply control circuit. The first electrode is arranged to protrude from one end portion of the pen-shaped housing along the axial center direction.

The second electrode includes at least three electrode pieces that are disposed near the first electrode in such a manner as to surround the central axis of the pen-shaped housing and that are electrically isolated from each other.

The signal supply control circuit controls the supply of signals so that a signal generated by the signal generation circuit is selectively supplied to the second electrode that includes the at least three electrode pieces and to the first electrode.

According to another embodiment of the present disclosure, there is provided a signal processor. The signal processor detects a condition of a position pointer on a sensor. The position pointer includes first and second electrodes. The first electrode is arranged to protrude from one end portion of a pen-shaped housing along the axial center direction. The second electrode is disposed near the first electrode in such a manner as to surround the central axis of the pen-shaped housing. The signal processor detects the condition of the position pointer through capacitive coupling between each of the first and second electrodes and the sensor that includes electrodes arranged in a grid pattern. The signal processor is connected to the sensor.

The signal processor includes an object area detection circuit, an object area emergence condition determination circuit, and a determination result indication circuit. The object area detection circuit detects an object area formed through capacitive coupling between at least one of the first and second electrodes and the sensor. The first and second electrodes are provided in the position pointer.

The object area emergence condition determination circuit determines a condition of emergence of the object area detected by the object area detection circuit.

The determination result indication circuit indicates, to the position pointer, the determination result made by the object area emergence condition determination circuit.

In the disclosure of the position pointer with such configuration, the signal generated by the signal generation circuit is selectively supplied to the first and second electrodes. The first electrode is disposed to protrude from one end portion of the pen-shaped housing along the axial center direction. The second electrode includes at least three electrode pieces that are disposed near the first electrode in such a manner as to surround the central axis of the pen-shaped housing and that are electrically isolated from each other. This facilitates a signal processor making up a position detector to detect the rotation and tilt angles of the position pointer.

In this case, signals can be transmitted to the sensor not only from the at least three electrode pieces that are disposed in such a manner as to surround the central axis of the pen-shaped housing and that are electrically isolated from each other but also from the first electrode that protrudes from one end portion of the pen-shaped housing along the axial center direction and that is closer to the sensor. This facilitates improved signal reception strength on the sensor from the position pointer.

Then, in addition to simultaneous supply of signals from all the at least three electrode pieces of the second electrode, a signal is transmitted from an electrode piece selected from among the at least three electrode pieces to the sensor, thus contributing to reduced power consumption and providing a suitable configuration for the battery-driven position pointer.

Further, because a signal is transmitted to the sensor from an electrode piece selected from among the at least three electrode pieces, it is only necessary for the position detector configured to receive the signal transmitted from the position pointer to perform position detection and signal level detection only for the signal being transmitted from the selected electrode piece. This contributes to reduced signal processing load and prevents interference between position pointing areas of each of the adjacent electrode pieces, thus allowing for proper detection of the signal level from each electrode piece and detection of the position pointed to by each electrode piece.

If the signal supply control circuit performs signal supply control designed to simultaneously supply a signal to each of the first electrode and the three electrode pieces, a signal is simultaneously supplied to each of the first electrode and the at least three electrode pieces in a hovering condition. This contributes to higher signal reception strength from the position pointer on the side of the position detector, thus allowing for detection of the hovering condition of the position pointer with high sensitivity.

The present disclosure provides a position pointer that facilitates meeting advanced functional demands such as position detection and detection of angular information such as tilt and rotation angles and hovering condition on the reception side with high sensitivity while at the same time keeping power consumption to a minimum. The present disclosure also provides a signal processor that can detect angular information of the position pointer on the sensor such as tilt and rotation, hovering condition thereof, and the condition of the position pointed to in the hovering condition with high efficiency and high sensitivity.

BRIEF DESCRIPTION OF THE SEVERAL VIEWS OF THE DRAWINGS

FIG. 4 is a diagram illustrating a flowchart for describing the flow of an example of processing operation of example components according to the first embodiment of the position pointer according to the present disclosure;

FIGS. 5A to 5E are diagrams illustrating timing charts for describing an example of processing operation of the example components according to the first embodiment of the position pointer according to the present disclosure;

FIGS. 6A to 6H are diagrams illustrating timing charts for describing an example of processing operation of the example components according to the first embodiment of the position pointer according to the present disclosure;

FIGS. 7A to 7G are diagrams illustrating timing charts for describing an example of processing operation of the example components according to the first embodiment of the position pointer according to the present disclosure;

FIG. 17 is a block diagram illustrating a configuration example of a signal processing circuit of a third embodiment of the position pointer according to the present disclosure;

FIGS. 18A to 18G are diagrams illustrating timing charts for describing an operation of the signal processing circuit of the third embodiment of the position pointer according to the present disclosure;

FIGS. 22A to 22G are diagrams illustrating timing charts for describing an operation of the signal processing circuit of the fifth embodiment of the position pointer according to the present disclosure.

DETAILED DESCRIPTION

Example embodiments of a position pointer and a position detector according to the present disclosure are described with reference to the drawings.

[First Embodiment]

Figure 1:
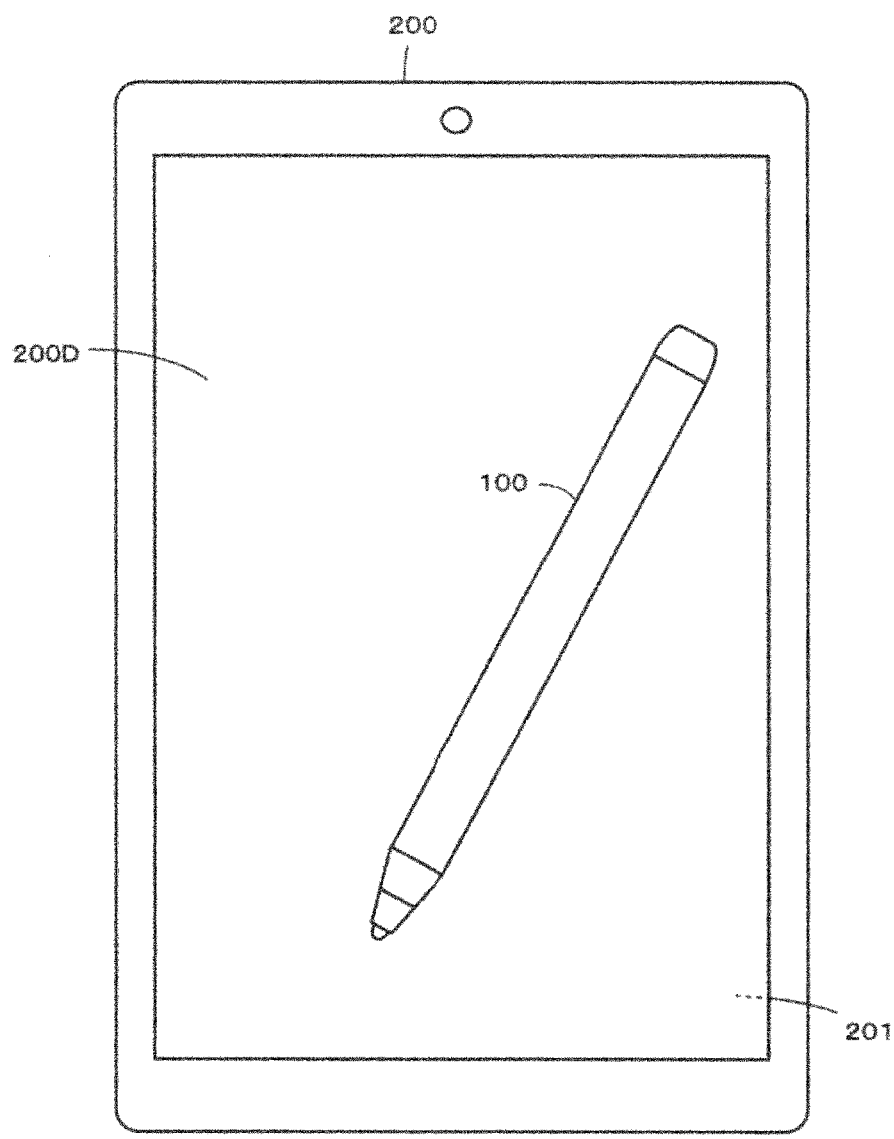
FIG. 1 is a diagram illustrating a position pointer according to an embodiment of the present disclosure together with an electronic device having a position detector.

FIG. 1 illustrates an example of a tablet information terminal 200 as an example of an electronic device using a position pointer 100 according to an embodiment of the present disclosure. In this example, the tablet information terminal 200 has a display screen 200D of a display device such as LCD (Liquid Crystal Display) and includes a capacitive position detector 201 on the upper portion (front side) of the display screen 200D.

The user makes a position pointing input on the sensor of the position detector 201 of the tablet information terminal 200 using a pointer such as the position pointer 100 or a finger. The position detector 201 not only detects the position pointed to on the sensor of the position detector 201 by the position pointer 100 or a finger but also angular information such as rotation and tilt angles of the position pointer 100 at the pointed position.

Structural Configuration of the Position Pointer 100 of the Embodiment

Figure 2A:
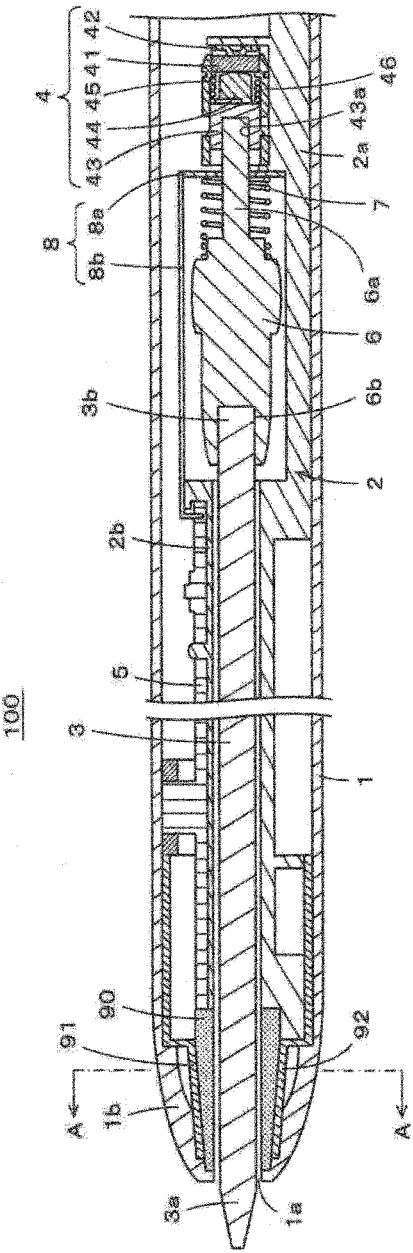
FIGS. 2A and 2B are sectional views for describing a structural configuration example of a first embodiment of the position pointer according to the present disclosure.
Figure 2B:
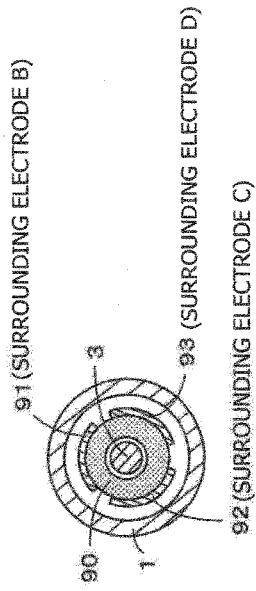

The position pointer 100 according to the present embodiment includes a housing (enclosure) 1 having a pen-shaped appearance. FIGS. 2A and 2B illustrate the outline of the structural configuration of the position pointer 100 of the present embodiment. FIG. 2A is a partial cutaway view of the housing 1 of the position pointer 100 and illustrates the inside of the position pointer 100. FIG. 2B is a sectional view along line A-A in FIG. 2A.

The housing 1 includes a hollow cylindrical insulator section made of an insulating material such as resin. It should be noted that at least the area of the external circumferential surface of the insulator section of the housing 1 gripped by the operator may be covered, for example, with a conductor section made of a metal.

A board holder 2 and a battery not shown in the figure, serving as a drive power source are accommodated in the hollow portion of the housing 1 as illustrated in FIG. 2A. The board holder 2 is made, for example, of an insulating resin such as liquid crystal polymer and includes a writing pressure detection module holding section 2a and a printed circuit board holding section 2b. The board holder 2 is restricted in position to prevent its movement along the axial center inside the housing 1.

The writing pressure detection module holding section 2a holds a writing pressure detection module 4 configured to detect the writing pressure applied to a core body 3 that makes up a center electrode A which will be described later. A printed circuit board 5 is held by the printed circuit board holding section 2b of the board holder 2.

A signal processing circuit according to the present embodiment is formed on the printed circuit board 5. That is, a plurality of electronic parts, such as resistors, capacitors, switching circuits, ICs (Integrated Circuits), wireless signal communication circuits, and so on and wiring patterns are formed on the printed circuit board 5. These parts make up the signal processing circuit.

The voltages of the drive power source configured to drive the signal processing circuit are generated by the battery that is not shown. A rechargeable secondary cell is used as this battery in this example. It should be noted that a rechargeable electric double-layer capacitor may be used instead of a battery.

The writing pressure detection module 4 in this example includes a variable capacitor whose capacitance varies in accordance with the writing pressure applied to the core body 3. The writing pressure detection module 4 in the present embodiment includes a known variable capacitor described, for example, in Japanese Patent Laid-Open No. 2011-186803.

The writing pressure detection module 4 includes a plurality of pressure-sensitive components, namely, a dielectric 41, a terminal member 42, a holding member 43, a conductive member 44, and an elastic member 45 as illustrated in FIG. 2A. These components are arranged side by side along the axial center direction in the hollow portion of a tubular body 46.

The variable capacitor configured as the writing pressure detection module 4 in this example includes the dielectric 41 sandwiched between the terminal member 42 and the conductive member 44. The terminal member 42 makes up one electrode of the variable capacitor, and the conductive member 44 another electrode. Although not shown, the terminal member 42 and the conductive member 44 are connected to the wiring pattern of the printed circuit board 5.

Then, the holding member 43 holding the conductive member 44 can move along the axial center direction in the tubular body 46. Then, the holding member 43 is always biased toward the side of the core body 3 by the elastic member 45 that includes a coil spring made of a conductive material. The conductive member 44 and the elastic member 45 are electrically connected. One end of the coil spring making up the elastic member 45 is connected to the wiring pattern of the printed circuit board 5 as the other electrode of the variable capacitor.

The core body 3 is held by a core body holder 6 in this example. Then, a rod-shaped portion 6a of the core body holder 6 is press-fitted into a recessed hole 43a of the holding member 43 of the writing pressure detection module 4, thus allowing the core body holder 6 to engage with the holding member 43 in such a manner as not to fall off toward the side of the core body 3. The pressure applied to the core body 3 is transferred to the writing pressure detection module 4 via the core body holder 6.

That is, when a pressure is applied to a tip 3a of the core body 3, the core body 3 and the core body holder 6 are displaced toward the side opposite to the side of the tip 3a of the core body 3 in accordance with the pressure. As a result of this displacement, the holding member 43 of the writing pressure detection module 4 is displaced toward the side of the dielectric 41 in resistance to the elastic biasing force of the elastic member 45. As a result, the conductive member 44 fitted in the holding member 43 is displaced toward the side of the dielectric 41, causing the distance between the conductive member 44 and the dielectric 41, and moreover, the contact area therebetween to change in accordance with the pressure applied to the core body 3. This changes the capacitance of the variable capacitor making up the writing pressure detection module 4 in accordance with the pressure applied to the core body 3. As a result, the writing pressure is detected by detecting the capacitance of the variable capacitor making up the writing pressure detection module 4.

In this example, the core body 3 makes up the center electrode A as an example of a first electrode and is made of a conductive material such as metal. It should be noted that the core body 3 may be made of a resin into which conductive metal powder is mixed or made of conductive felt.

The core body 3 is held by the core body holder 6 as a result of an end portion 3b on the opposite side of the tip 3a of the core body 3 fitted into a fitting recessed portion 6b of the core body holder 6. The core body 3 can be pulled out of the core body holder 6 if pulled with a given force when fitted in and held by the core body holder 6. At this time, the core body holder 6 is locked by the wall of the stepped portion between the writing pressure detection module holding section 2a and the printed circuit board holding section 2b of the board holder 2, thus preventing the core body holder 6 from falling off toward the side of the tip 3a of the core body 3.

It should be noted that when the core body 3 and the core body holder 6 are in engagement and accommodated in the housing 1, the central axis positions of the core body 3 and the core body holder 6 coincide with that of the hollow portion of the housing 1. Then, in this condition, the tip 3a of the core body 3 protrudes externally from an opening 1a formed in one end portion 1b of the housing 1 along the axial center direction. The printed circuit board holding section 2b of the board holder 2 has a space at the central axis position of the hollow portion of the housing 1 as illustrated in FIG. 2A so that the printed circuit board 5 is held off the central axis position of the hollow portion of the housing 1. The above space is provided to insert the core body 3.

In the present embodiment, the core body holder 6 holding the core body 3 is also made of a conductive material.

The conductive core body 3 is electrically connected to the signal processing circuit formed on the printed circuit board 5 via the core body holder 6 as will be described below.

That is, a coil spring 7 made of a conductive material such as conductive metal is fitted to the rod-shaped portion 6a of the core body holder 6. The core body holder 6 is always biased toward the side of the core body 3 relative to the board holder 2.

Then, in the present embodiment, the writing pressure detection module holding section 2a of the board holder 2 has a conductive terminal member 8 as illustrated in FIG. 2A. The conductive terminal member 8 is used to electrically connect the conductive core body 3 to the signal processing circuit of the printed circuit board 5 via the conductive core body holder 6 and the conductive coil spring 7. The conductive terminal member 8 includes a contact plate portion 8a and an extended portion 8b. The contact plate portion 8a is in contact with one end of the coil spring 7. The extended portion 8b is connected to the wiring pattern that is connected to the contact plate portion 8a and the signal processing circuit of the printed circuit board 5. The signal from the signal processing circuit is supplied to the core body 3 making up the center electrode A via the conductive terminal member 8, the coil spring 7, and the core body holder 6.

Three electrode pieces 91, 92, and 93 making up a second electrode are arranged in the hollow portion on the side of the opening 1a of the housing 1 in such a manner as to surround the central axis of the enclosure. The three electrode pieces 91, 92, and 93 are made, for example, of a conductive metallic material or a conductive resin such as conductive rubber. The electrode pieces 91, 92, and 93 are electrically isolated from the core body 3 and are electrically isolated from one another as illustrated in FIG. 2B, a sectional view along line A-A in FIG. 2A.

In this case, the three electrode pieces 91, 92, and 93 are formed in the same shape and size and circumferentially at the same distance from one another. Therefore, the three electrode pieces 91, 92, and 93 are arranged at positions 120 degrees apart from one another in the present embodiment.

An insulating member 90 is a cylindrical member having a through hole into which the core body 3 is inserted. In this example, the insulating member 90 is provided on the end portion of the printed circuit board holding section 2b of the board holder 2 on the side of the opening 1a of the housing 1. The outer perimeter side surface of the insulating member 90 is tapered in the form of a truncated cone whose diameter gradually decreases with decreasing distance to the opening 1a.

Then, the electrode pieces 91, 92, and 93 are disposed to be separated from one another, for example, by bonding or deposition in such a manner as to each cover a given angular range of the outer perimeter side surface of the insulating member 90 in the form of a truncated cone as illustrated in FIGS. 2A and 2B. That is, the electrode pieces 91, 92, and 93 each cover an angular range of less than 120 degrees of the outer perimeter side surface of the insulating member 90 and are separated from one another by the same angular range. In this case, each of the electrode pieces 91, 92, and 93 may cover an angular range between 60 and 90 degrees of the outer perimeter side surface of the insulating member 90. In this example, each of the electrode pieces 91, 92, and 93 covers an angular range of 90 degrees. In this example, therefore, the electrode pieces 91, 92, and 93 are separated from one another by an angular range of 30 degrees.

The electrode pieces 91, 92, and 93 are connected to the respective wiring patterns that are, in turn, connected to the signal processing circuit of the printed circuit board 5 in the wiring connection section which is not shown.

It should be noted that the three electrode pieces 91, 92, and 93 may be formed by deposition or printing on the outer perimeter side surface of the insulating member 90 in the form of a truncated cone. The insulating member 90 is arranged near the opening 1a of the housing 1.

In the present embodiment, as described above, the writing pressure detection module holding section 2a of the board holder 2 at which the writing pressure detection module 4 and the core body holder 6 are held and the printed circuit board holding section 2b at which the printed circuit board 5, the insulating member 90, and the three electrode pieces 91, 92, and 93 are held are integrated into a single modular component. Then, a battery compartment section is connected to the writing pressure detection module holding section 2a of the modular component. The battery compartment section and the writing pressure detection module holding section 2a are put into the hollow portion of the housing 1 from an opening on the side opposite to the opening 1a. Then, the opening on the side opposite to the opening 1a is closed by a cover portion. Then, the core body 3 is inserted from the opening 1a and brought into engagement with the core body holder 6, thus forming the position pointer 100.

It should be noted that the housing 1 on the side of the opening 1a may be separate from the main body of the housing 1 as a cap portion so that the cap portion is screwed into the main body of the housing 1.

Configuration Example of a Signal Processing Circuit of the Position Pointer 100

Figure 3:
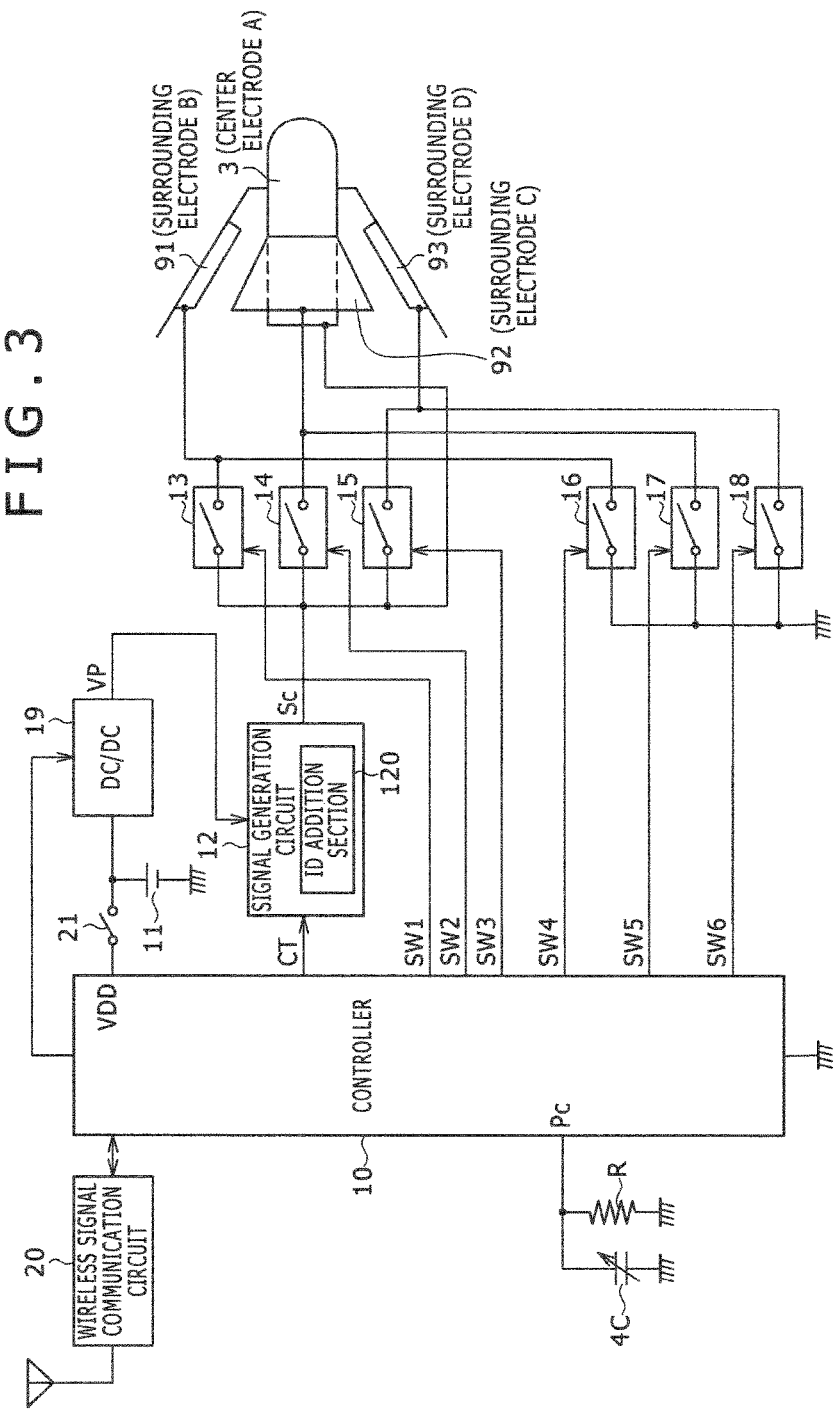
FIG. 3 is a block diagram illustrating a configuration example of a signal processing circuit according to the first embodiment of the position pointer according to the present disclosure.

FIG. 3 is a block diagram illustrating a configuration example of a signal processing circuit of the position pointer 100 in the first embodiment. That is, the signal processing circuit of the position pointer 100 includes a controller 10, a battery 11 serving as a drive power source such as rechargeable secondary cell, a signal generation circuit 12, switching circuits 13, 14, 15, 16, 17, and 18, a DC/DC (direct current/direct current) converter 19, and a wireless signal communication circuit 20. Then, a variable capacitor 4C making up the writing pressure detection module 4 is connected to the controller 10.

As illustrated in FIG. 3, the position pointer 100 includes a power switch 21. When the power switch 21 is turned ON, the voltage of the battery 11 is applied to the controller 10 as a supply voltage VDD. Although not illustrated in FIGS. 2A and 2B, the power switch 21 is turned ON when a pushbutton provided to be exposed on the outer perimeter side surface of the housing 1 is pressed by the user.

The controller 10 includes, for example, a microprocessor and makes up a control circuit configured to control the processing operation of the position pointer 100 which will be described later. The supply voltage VDD is supplied to the controller 10 from the battery 11 as an example of a drive power source. The controller 10 not only controls the signal generation circuit 12 and controls each of the switching circuits 13, 14, 15, 16, 17, and 18 to turn ON or OFF but also detects the writing pressure applied via the core body 3 of the position pointer 100 by monitoring the capacitance of the variable capacitor 4C as will be described later. In the present embodiment, the controller 10 detects the writing pressure from the discharge time of the variable capacitor 4C as will be described later.

In the first embodiment, the signal generation circuit 12 includes an oscillation circuit configured to generate an AC signal at a given frequency f1 such as f1=1.8 MHz. The controller 10 controls the oscillation circuit making up the signal generation circuit 12 to turn ON or OFF by supplying a control signal CT to the oscillation circuit. Therefore, the oscillation circuit making up the signal generation circuit 12 continues intermittently the generation of an AC signal in response to the control signal CT from the controller 10. Thus the signal generation circuit 12 generates a signal Sc made up of an ASK (Amplitude Shift Keying) modulated signal. That is, the signal generation circuit 12 generates the ASK modulated signal by controlling the oscillation circuit making up the signal generation circuit 12 using the controller 10. An OOK (On Off Keying) modulated signal may be generated by the signal generation circuit 12 rather than an ASK modulation.

Then, in the present embodiment, the controller 10 adds identification information (ID) to the output signal to identify which of the electrode pieces 91, 92, and 93 is selected by means of an ASK modulated signal in the signal generation circuit 12 as will be described later. That is, the signal generation circuit 12 includes an ID addition section 120 as a function. Further, the signal generation circuit 12 generates, as an ASK modulated signal, the signal Sc under control by the control signal CT from the controller 10. The signal Sc includes a continuous transmission signal (burst signal) and necessary additional information. The signal Sc is intended not only to cause the position detector 201 to detect the position pointed to by the position pointer 100 but also to allow the position detector 201 to handle signal demodulation in synchronism with the signal transmission timing of the signal from the position pointer 100.

The signal Sc from the signal generation circuit 12 is amplified by an amplifier which is not shown first. Then, in the present embodiment, the signal Sc is supplied to the center electrode A which makes up the core body 3. At the same time, the signal Sc is supplied to the electrode pieces 91, 92, and 93 respectively via the switching circuits 13, 14, and 15. The switching circuits 13, 14, and 15 are controlled to turn ON or OFF respectively by switching control signals SW1, SW2, and SW3, from the controller 10. This allows the signal Sc from the signal generation circuit 12 to be selectively supplied to the electrode pieces 91, 92, and 93.

Further, the electrode pieces 91, 92, and 93 are coupled to a ground node respectively by the switching circuits 16, 17, and 18 in the present embodiment. The switching circuits 16, 17, and 18 are controlled to turn ON or OFF respectively by switching control signals SW4, SW5, and SW6, from the controller 10. The electrode pieces 91, 92, and 93 are controlled so that they are coupled to the ground node, for example, when the signal Sc is not supplied thereto.

In this case, the switching control signal SW4 is reverse in phase to the switching control signal SW1. The switching control signal SW5 is reverse in phase to the switching control signal SW2. The switching control signal SW6 is reverse in phase to the switching control signal SW3.

That is, of the switching circuits 13, 14, and 15, the one that is connected to the electrode piece 91, 92, or 93 supplied with the signal Sc is turned ON. On the other hand, of the switching circuits 16, 17, and 18, the two that are connected to the two of the electrode pieces 91, 92, and 93 other than the one supplied with the signal Sc are turned ON.

As a result, of all the electrode pieces 91, 92, and 93, the sensor of the position detector 201 capacitively couples only with the one supplied with the signal Sc of all the switching circuits 13, 14, and 15. This prevents adverse effect of the two electrode pieces other than the one supplied with the signal Sc, thus making it easy to identify the signal from the electrode piece of interest.

It should be noted that the switching circuits 16, 17, and 18 may be not provided, and that those not supplied with the signal Sc of all the electrode pieces 91, 92, and 93 may be left floating (those of the switching circuits 13, 14, and 15 connected to the electrode pieces not supplied with the signal Sc are OFF).

The DC/DC converter 19 steps up the voltage of the battery 11, thus generating power at a voltage VP. In the present embodiment, the DC/DC converter 19 is controlled by the controller 10. For example, the DC/DC converter 19 generates the output voltage VP at a plurality of signal levels such as 9V and 30V. It should be noted that the signal level may be varied from 9V to 30V. The signal generation circuit 12 receives the voltage VP having the plurality of signal levels as described above as a drive voltage, thus producing the signal Sc having an amplitude proportional to that of the voltage VP.

The wireless signal communication circuit 20 wirelessly exchanges signals with the position detector 201. In this example, the wireless signal communication circuit 20 uses short-range wireless communication technique compliant with Bluetooth (registered trademark) standard. It should be noted that the wireless signal communication circuit 20 may use a wireless communication technique compliant with a Wi-Fi standard. Alternatively, the wireless signal communication circuit 20 may use other wireless communication technique such as infrared or optical wireless communication.

In this example, the wireless signal communication circuit 20 transmits identification information to the position detector 201. The identification information is assigned to each of the position pointers 100 for identification thereof. Further, the wireless signal communication circuit 20 receives, from the position detector 201, a mode instruction signal that includes a hovering mode and a position pointing mode. The controller 10 switches the position pointer 100 between the hovering mode and the position pointing mode on the basis of a mode instruction signal supplied from the position detector 201, thus controlling the transmission of an AC signal from the position pointer 100. A description will be given below of the mode switching operation by the controller 10 for controlling the transmission of an AC signal from the position pointer 100.

Example of Processing Operation of the Position Pointer 100

The controller 10 of the position pointer 100 according to the first embodiment performs mode switching operation of the position pointer 100 on the basis of a wireless signal exchanged with the position detector 201 when the power switch 21 is ON and the controller 10 is powered ON, thus controlling the transmission of an AC signal. FIG. 4 is a flowchart for describing an example of flow of switching setting operation for AC signal transmission by the controller 10 of the position pointer 100 according to the first embodiment. Further, FIGS. 5A to 7G are timing charts for describing the operation of the position pointer 100.

It should be noted that, in the description given below, the core body 3 will be referred to as the center electrode A, and the electrode pieces 91, 92, and 93 as surrounding electrodes B, C, and D respectively.

In the present embodiment, when the power switch 21 of the position pointer 100 is turned ON, the supply voltage is supplied to the wireless signal communication circuit 20. This initiates wireless signal communication operation with the position detector 201 via the wireless signal communication circuit 20 (step S101). As a result, the controller 10 determines whether or not signals can be exchanged wirelessly with the position detector 201 (step S102). When the controller 10 determines that it is not possible to wirelessly exchange signals with the position detector 201 in step S102, the controller 10 stops the oscillation operation of the oscillation circuit making up the signal generation circuit 12 (step S103). Therefore, the signal Sc is not transmitted. Then, the controller 10 returns the process to step S101 to repeat the processes from step S101 onward.

On the other hand, in step S102, when the controller 10 determines that signals can be exchanged wirelessly with the position detector 201 in step S102, the controller 10 places the position pointer 100 into a signal transmission state in the hovering mode (step S104).

In the hovering mode, the controller 10 controls the signal transmission so that identification information of the position pointer 100 is wirelessly transmitted to the position detector 201 via the wireless signal communication circuit 20, and so that the AC signal generated by the signal generation circuit 12 is transmitted to the sensor of the position detector 201 from the center electrode A and the surrounding electrodes B, C, and D (refer to FIG. 5A).

That is, in the hovering mode, the controller 10 maintains the switching circuits 13, 14, and 15 always ON using the switching control signals SW1, SW2, and SW3 and maintains the switching circuits 16, 17, and 18 always OFF using the switching control signals SW4, SW5, and SW6. Then, the controller 10 intermittently drives the oscillation circuit making up the signal generation circuit 12 using the control signal CT, thus transmitting the signal Sc from each of the center electrode A and the surrounding electrodes B, C, and D intermittently at intervals TH in the form of a burst signal as illustrated in FIGS. 6A to 6D.

The process in the hovering mode is different from that in the position pointing mode in which the position pointer 100 comes in contact with the sensor surface of the position detector 201 to point to a specific position. The process in the hovering mode is designed to allow the position detector 201 to properly detect the condition in which the position pointer is near and above the sensor of the position detector 201 (so-called hovering condition). With the process in the hovering mode, instead of the transmission from only the center electrode, the AC signal from the position pointer 100 is transmitted simultaneously from all of the center electrode A making up the first conductor and the three surrounding electrodes B, C, and D making up the second conductor, thus increasing the energy of the transmitted AC signal and making it easier for the sensor of the position detector 201 to detect the AC signal from the position pointer 100.

In the hovering mode, the controller 10 controls the DC/DC converter 19 to set the voltage VP to a first signal level such as 30V, thus increasing the amplitude of the signal Sc output from the signal generation circuit 12. On the other hand, the signal Sc is transmitted intermittently by controlling the duty ratio of the signal Sc during a signal transmission period at the intervals TH. This ensures that the time-averaged power consumption is equivalent to that during transmission of the signal Sc at a second signal level that is lower than a first signal level in position pointing mode which will be described later. That is, during transmission of the signal at a high level, the signal Sc is transmitted intermittently over a short period of time, thus preventing increase in power consumption.

As described above, an AC signal is transmitted from all of the center electrode A and the surrounding electrodes B, C, and D. Moreover, the amplitude of the signal Sc is increased. This provides a larger energy with which to transmit the signal Sc from the position pointer 100 even when the position pointer 100 is detached from and suspended in the air above the sensor surface of the position detector 201 (hovering condition), thus making it possible for the position detector 201 to readily detect the hovering position pointer 100.

It should be noted that, in the above description, the signal Sc is transmitted from all of the center electrode A and the surrounding electrodes B, C, and D in hovering mode during each of the intervals TH. As illustrated in FIGS. 6E to 6H, however, the signal Sc may be transmitted in the form of a burst signal from the center electrode A during each of the intervals TH, and the surrounding electrodes B, C, and D may be switched from one to another at the intervals TH to selectively transmit the signal Sc. Alternatively, the center electrode A may be not supplied with any AC signal, whereas only the surrounding electrodes B, C, and D may be supplied with AC signals as illustrated in FIGS. 6B to 6D or 6F to 6H. Still alternatively, if there is a limitation to the remaining power of the drive power source, a possible consideration would be to supply an AC signal only to the center electrode A.

When the position detector 201 receives the signal Sc from the position pointer 100 set in the hovering mode, the position detector 201 detects whether or not the tip 3a of the core body 3 of the position pointer 100 is in proximity or within a determined distance to the sensor surface of the position detector 201 such as 5 mm to 1 cm as will be described later. Then, when the position detector 201 determines that the position pointer 100 is not in proximity, the position detector 201 wirelessly transmits an instruction to the position pointer 100 to set the hovering mode. When the position detector 201 determines that the position pointer 100 is in proximity, the position detector 201 wirelessly transmits an instruction to the position pointer 100 to select the position pointing mode (instruction to switch to the position pointing mode).

It should be noted that, in the present embodiment, even if the position pointer 100 moves away from the sensor of the position detector 201 to be no longer in proximity for a short period of time not longer than a determined period of time (e.g., one second) after the position detector 201 instructs the position pointer 100 to select position pointing mode, the position detector 201 will not immediately transmit an instruction to the position pointer 100 to switch to the hovering mode. The reason for this is that so long as the position pointer 100 is moved away only for a short period of time such as one second or less, the user probably still has intention to continue to point positions by the position pointer 100. That is, a given time period is provided as switching hysteresis for switching between the hovering mode and the position pointing mode.

The controller 10 of the position pointer 100 placed into an AC signal transmission state in hovering mode in step S104 monitors the signal received by the wireless signal communication circuit 20 from the position detector 201, determining whether or not an instruction has been received from the position detector 201 to select position pointing mode (step S105).

If it is determined in step S105 that an instruction has been received to select the hovering mode rather than an instruction to select the position pointing mode, the controller 10 returns the process to step S104 to repeat the processes from step S104 onward.

On the other hand, when it is determined in step S105 that an instruction has been received to select the position pointing mode, the controller 10 places the position pointer 100 into the signal transmission state in the position pointing mode (step S106).

Also in position pointing mode, the controller 10 exercises control so that identification information of the position pointer 100 is transmitted wirelessly to the position detector 201 via the wireless signal communication circuit 20. Then, the controller 10 always transmits an AC signal, generated by the signal generation circuit 12, from the center electrode A and selectively switches the surrounding electrodes B, C, and D from one to another to transmit the signal Sc (refer FIGS. 5B to 5E). This is intended to allow the position detector 201 to detect not only the position pointed to by the position pointer 100 but also the rotation and tilt angles of the position pointer 100.

It should be noted that, in the position pointing mode, the controller 10 controls the DC/DC converter 19 to set the voltage VP to a second signal level such as 9 V which is lower than the first signal level. Even at such a lower voltage level, the position pointer 100 in position pointing mode is in contact with or sufficiently in proximity to the sensor surface of the position detector 201, thus allowing for the position detector 201 to receive a signal transmitted from the position pointer 100 with high sensitivity.

In the present embodiment, in position pointing mode, the controller 10 switches time periods TB, TC, and TD from one to another as illustrated in FIGS. 5B and 7A. During the time period TB, the signal Sc is transmitted from the center electrode A and the surrounding electrode B. During the time period TC, the signal Sc is transmitted from the center electrode A and the surrounding electrode C. During the time period TD, the signal Sc is transmitted from the center electrode A and the surrounding electrode D. Then, the controller 10 controls the switching circuits 13 to 18 in such a manner that a time period T (refer to FIG. 7A) equal in length to the sum of the time periods TB, TC, and TD is repeated as one cycle.

That is, as illustrated in FIGS. 7B to 7D, the controller 10 turns ON the switching circuit 13 during the time period TB, turns ON the switching circuit 14 during the time period TC, and turns ON the switching circuit 15 during the time period TD so as to transmit the signal Sc. The surrounding electrodes B, C, and D are connected respectively to the switching circuits 13, 14, and 15 using the switching control signals SW1, SW2, and SW3.

Further, as illustrated in FIGS. 7E to 7G, the controller 10 turns ON the switching circuits 17 and 18 using the switching control signals SW5 and SW6 during the time period TB so as to couple to the ground node the surrounding electrodes C and D that are not supplied with the signal Sc, and turns ON the switching circuits 16 and 18 using the switching control signals SW4 and SW6 during the time period TC so as to couple to the ground node the surrounding electrodes B and D that are not supplied with the signal Sc, and turns ON the switching circuits 16 and 17 using the switching control signals SW4 and SW5 during the time period TD so as to couple to the ground node the surrounding electrodes B and C that are not supplied with the signal Sc.

Then, in the present embodiment, the controller 10 adds one of three pieces of identification information to the AC signal from the oscillation circuit in the signal generation circuit 12, namely, identification information indicating the transmission period involving the center electrode A and the surrounding electrode B, that involving the center electrode A and the surrounding electrode C, and that involving the center electrode A and the surrounding electrode D respectively during the time periods TB, TC, and TD. Further, in the present embodiment, during the time period TB, the controller 10 detects the writing pressure applied to the core body 3 on the basis of the capacitance of the variable capacitor 4C making up the writing pressure detection module 4 and adds information about the detected writing pressure (writing pressure data). In the first embodiment, therefore, the time period TB is longer than the time periods TC and TD.

A description will be given below of the processing operation performed by the controller 10 during the time periods TB, TC, and TD with reference to the timing charts shown in FIGS. 5A to 5E and 7A to 7G.

That is, during the time period TB, the controller 10 turns ON the switching circuit 13 first and leaves the other switching circuits 14 and 15 OFF so that the surrounding electrode B of the three surrounding electrodes B, C, and D is selected as illustrated in FIGS. 7B to 7D. Then, with the selected state, the controller 10 maintains the control signal CT at high level for a given period of time as illustrated in FIG. 5C so that the AC signal is continuously output from the oscillation circuit making up the signal generation circuit 12 for the given period of time. As a result, the center electrode A and the surrounding electrode B continuously emit a burst signal which is a succession of AC signals at the frequency f1 for the given period of time (refer to a burst signal transmission period (AB) in FIG. 5E).

The controller 10 finds the writing pressure applied to the variable capacitor 4C making up the writing pressure detection module 4 by controlling a terminal Pc connected to the variable capacitor 4C during the burst signal transmission period (AB) within the time period TB. That is, the controller 10 pulls the terminal Pc up to high level, thus charging the variable capacitor 4C. Next, the controller 10 switches the terminal Pc to input state. At this time, the charge stored in the variable capacitor 4C is discharged by a resistor R that is connected in parallel with the variable capacitor 4C, thus causing a voltage Ec (refer to FIG. 5D) of the variable capacitor 4C to drop gradually. The controller 10 finds a time Tp from when the terminal Pc is switched to input state to when the voltage Ec of the variable capacitor 4C drops equal to or lower than the determined threshold voltage. The time Tp corresponds to the writing pressure to be found. The controller 10 finds the writing pressure, for example, as a value having a plurality of bits such as a 10-bit value from the time Tp.

When the burst signal transmission period (AB) within the time period TB ends, the controller 10 pulls the control signal CT (refer to FIG. 5C) up to high level or down to low level at given intervals Td, thus controlling the signal generation circuit 12 and performing ASK modulation of the AC signal from the oscillation circuit. At this time, the controller 10 pulls the control signal CT up to high level and outputs a signal for a given period of time (refer to the start signal in FIG. 5E) at the first time. The start signal is provided for the side of the position detector 201 to be able to correctly determine the subsequent data transmission timings. That is, the start signal is provided to synchronize signal processing by the position detector 201 such as ASK demodulation with the signal transmission timings of the start signal from the position pointer 100 received by the position detector 201. That is, the position detector 201 can synchronize signal processing of the signal received from the position pointer 100 such as ASK demodulation using the start signal.

It should be noted that burst signals during the burst signal transmission period (AB) and burst signal transmission periods (AC) and (AD) which will be described later can be used as transmission timings of signals transmitted from the position pointer 100 to synchronize signal processing by the position detector 201 with the signal transmission timings.

The two Td periods following the start signal are the periods during which identification information is transmitted. Identification information identifies the electrode transmitting the signal Sc from the position pointer 100, that is, the surrounding electrode B configured to transmit the signal Sc together with the center electrode A within the time period TB. In this example, the controller 10 controls the control signal CT during this identification information transmission period so that code "00" is assigned to the surrounding electrode B as two-bit identification information as illustrated in FIG. 5E. A two-bit code is used to identify each of the three surrounding electrodes B, C, and D.

The controller 10 sequentially transmits 10-bit writing pressure data, found from the above operation, following the identification information of the surrounding electrode B. That is, when the transmission data is "0," the controller 10 pulls the control signal CT (refer to FIG. 5C) down to low level so as to interrupt the generation of an AC signal from the oscillation circuit of the signal generation circuit 12. On the other hand, when the transmission data is "1," the controller 10 pulls the control signal CT (refer to FIG. 5C) up to high level so as to permit the generation of an AC signal from the oscillation circuit of the signal generation circuit 12, thus achieving ASK modulation (refer to a writing pressure data transmission period in FIG. 5E). FIG. 5C shows that the transmitted writing pressure is "0101110101."

When the transmission of the 10-bit writing pressure data ends, the controller 10 turns OFF the switching circuits 13 and 15 and turns ON only the switching circuit 14 using the switching control signals SW1, SW2, and SW3 (refer to FIGS. 7B to 7D) to terminate the selection period of the center electrode A and the surrounding electrode B and switch over to the selection period TC of the center electrode A and the surrounding electrode C.

Then, during the selection period TC of the center electrode A and the surrounding electrode C, the controller 10 maintains the control signal CT at high level for the given period of time as illustrated in FIG. 5C as during the time period TB, thus causing an AC signal to be continuously output as the signal Sc from the oscillation circuit of the signal generation circuit 12 for the given period of time. This causes the center electrode A and the surrounding electrode C to continuously transmit burst signals for the given period of time (refer to a burst signal transmission period (AC) in FIG. 5E).

When the burst signal transmission period (AC) ends during the time period TC, the controller 10 pulls the control signal CT (refer to FIG. 5C) up to high level, thus transmitting the start signal. Then, the controller 10 controls the control signal CT so that code "10," in this example, is assigned as two-bit identification information for identifying the surrounding electrode C configured to transmit the signal Sc together with the center electrode A. In this example, no writing pressure detection operation is performed, and no writing pressure data is transmitted during the selection period TC of the center electrode A and the surrounding electrode C as described earlier. Of course, the writing pressure detection operation may be performed, and writing pressure data may be transmitted during the selection period TC of the center electrode A and the surrounding electrode C.

When the transmission of identification information of the surrounding electrode C configured to transmit the signal Sc together with the center electrode A ends during the time period TC, the controller 10 turns OFF the switching circuits 13 and 14 and turns ON only the switching circuit 15 using the switching control signals SW1, SW2, and SW3 to terminate the time period TC and switch over to the selection period TD of the center electrode A and the surrounding electrode D.

During the selection period TD of the center electrode A and the surrounding electrode D, the controller 10 maintains the control signal CT (refer to FIG. 5C) at high level for the given period of time as during the selection period TC of the center electrode A and the surrounding electrode C, thus causing an AC signal to be continuously output as the signal Sc from the oscillation circuit of the signal generation circuit 12 for the given period of time. This causes the center electrode A and the surrounding electrode D to continuously transmit burst signals for the given period of time (refer to a burst signal transmission period (AD) in FIG. 5E).

Then, when the burst signal transmission period (AD) ends, the controller 10 transmits the start signal by pulling the control signal CT up to high level and controls the control signal CT so that code "01" is assigned in this example as two-bit identification information for identifying the surrounding electrode D configured to transmit the signal Sc together with the center electrode A. In this example, no writing pressure detection operation is performed, and no writing pressure data is transmitted during the selection period TD of the center electrode A and the surrounding electrode D. Of course, the writing pressure detection operation may be performed, and writing pressure data may be transmitted during the time period TD.

When the transmission of identification information of the surrounding electrode D configured to transmit the signal Sc together with the center electrode A ends after the burst signal transmission period (AD) during the time period TD, the controller 10 turns ON the switching circuit 13 and turns OFF the other switching circuits 14 and 15 by controlling the switching control signals SW1, SW2, and SW3 to terminate the time period Td and return to the selection period TB of the center electrode A and the surrounding electrode B. Then, the controller 10 performs the above control operation during the time period TB. From here onward, the controller 10 sequentially switches the time periods TB, TC, and TD from one to another in a cyclic manner in the position pointing mode in step S106.

After step S106, the controller 10 monitors the signal received by the wireless signal communication circuit 20 from the position detector 201, determining whether a signal has been received from the position detector 201 to instruct to select the hovering mode (instruction to switch to the hovering mode) (step S107). If it is determined in step S107 that an instruction has been received to select the position pointing mode rather than an instruction to select the hovering mode, the controller 10 returns the process to step S106 to repeat the processes from step S106 onward.

Then, when the controller 10 determines in step S107 that an instruction has been received to select the hovering mode, the controller 10 returns the process to step S104 to perform the process in the hovering mode and then repeat the above processes from step S104 onward.

Configuration Example of the Position Detector 201

A description will be given next of a configuration example of the position detector 201 according to the first embodiment which is used together with the position pointer 100 described above.

Figure 8:
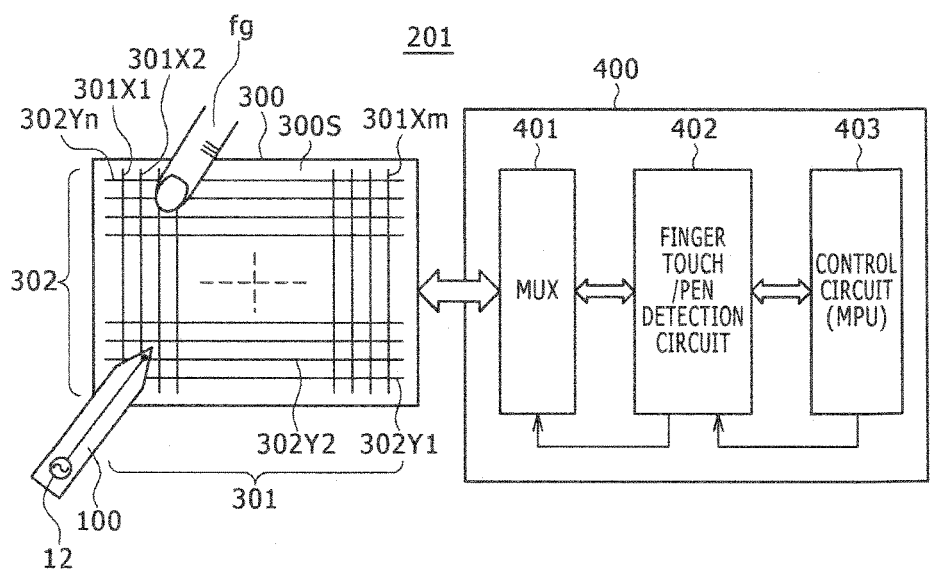
FIG. 8 is a diagram for describing the outline of the position detector used together with an embodiment of the position pointer according to the present disclosure.

FIG. 8 is a diagram for describing a schematic configuration example of the position detector 201 according to the present embodiment. The position detector 201 in this example is a capacitive position detector which includes a so-called cross-point (mutual capacitance) sensor. The position detector 201 supplies transmission signals to conductors arranged in a first direction and receives signals from conductors arranged in a second direction different from the first direction when detecting a capacitive touch with a finger or other pointer, and multiple touches, in particular. Further, when the pointer is an active capacitive pen such as the above described position pointer 100 that includes an electric circuit configured to transmit a position pointing signal and a drive power source configured to drive the electric circuit, the position detector 201 receives signals from the conductors arranged in the first and second directions. It should be noted that the principle behind a cross-point capacitive position detector is described in detail, for example, in Japanese Patent Laid-Open Nos. 2011-3035, 2011-3036, and 2012-123599, the laid-open application publications relating to the applicant of the present application.

The position detector 201 according to the present embodiment includes a sensor 300 and a control device section 400 as illustrated in FIG. 8. The sensor 300 makes up a touch panel (position detection sensor).

Figure 10:
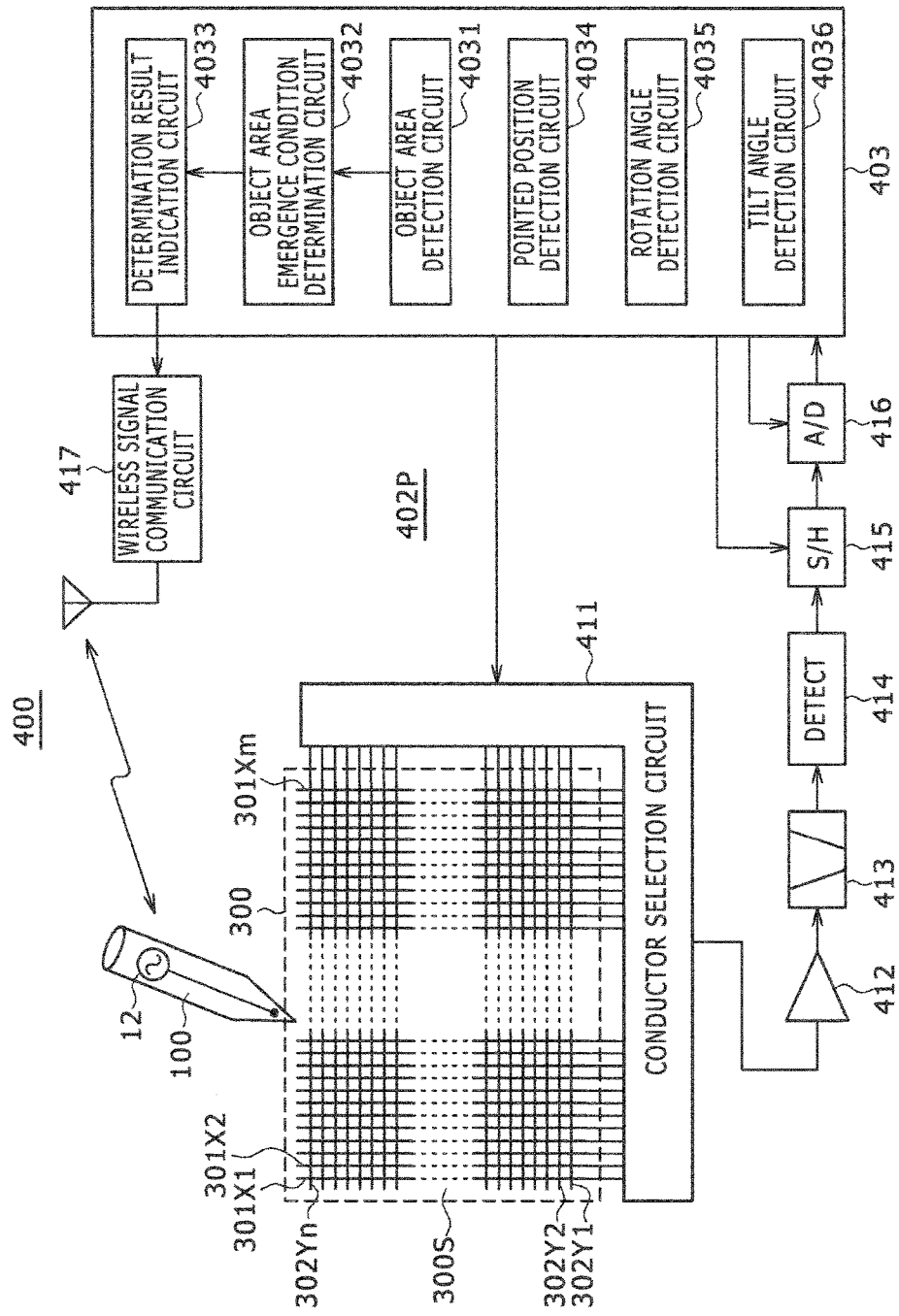
FIG. 10 is a diagram illustrating a configuration example of an embodiment of a signal processor used together with the first embodiment of the position pointer according to the present disclosure.

The sensor 300 in this example is formed by stacking, from the lower layer, a Y conductor group 302, an insulating layer, and an X conductor group 301 in this order, and includes a grid configuration in which the X conductor group 301 and the Y conductor group 302 cross each other in the direction in which they are orthogonal to one another. The Y conductor group 302 includes, for example, a plurality of Y conductors $302Y_1$, $302Y_2$ and so on up to $302Y_n$ (where n is an integer equal to or greater than 1) that extend in the horizontal direction (X-axis direction) and are arranged in parallel with a given spacing therebetween as illustrated in FIG. 8 and FIG. 10 which will be described later. Further, the X conductor group 301 includes a plurality of X conductors $301X_1$, $301X_2$ and so on up to $301X_m$ (where m is an integer equal to or greater than 1) that extend in a direction intersecting the Y conductors $302Y_1$, $302Y_2$ and so on up to $302Y_n$, and, in this example, in the vertical direction (Y-axis direction) orthogonal to the Y conductors $302Y_1$, $302Y_2$ and so on up to $302Y_n$ and are arranged in parallel with a given spacing therebetween.

In the sensor 300 according to the present embodiment, the plurality of X conductors $301X_1$, $301X_2$ and so on up to $301X_m$ making up the X conductor group 301 are first conductors, and the plurality of Y conductors $302Y_1$, $302Y_2$ and so on up to $302Y_n$ making up the Y conductor group 302 are second conductors. Thus, the position detector 201 detects a position pointed to by a pointer such as a finger fg or the position pointer 100 making up the active capacitive pen using a sensor pattern formed by crossing the X and Y conductors.

Then, the position detector 201 according to the present embodiment is incorporated in an electronic device such as mobile device called smartphone for use. Therefore, the sensor 300 is sized to match the sizes of the display screens of electronic devices. A pointing input surface (sensor surface) 300S of, for example, about four inches in size is formed with the X conductor group 301 and the Y conductor group 302 that are optically transparent.

It should be noted that the X conductor group 301 and the Y conductor group 302 may be arranged on the same side of the sensor board. Alternatively, the X conductor group 301 may be arranged on one side of the sensor board, and the Y conductor group 302 on the other side of the sensor board.

The control device section 400 includes a multiplexer 401, a finger touch/pen detection circuit 402, and a control circuit 403. The multiplexer 401 serves as an input/output interface for communication with the sensor 300.

Figure 9:
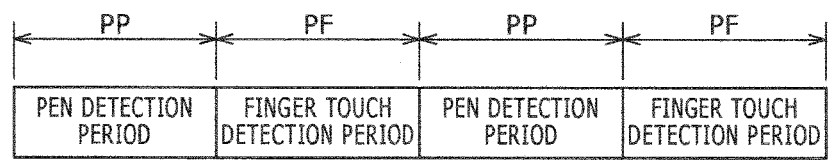
FIG. 9 is a diagram used to describe the position detector shown in the example of FIG. 8.

The control circuit 403 is designed to control the operation of the position detector 201 as a whole and includes an MPU (microprocessor unit) in this example. The position detector 201 according to the present embodiment controls finger touch detection and pen touch detection by the position pointer 100 or the like in a time shared manner. That is, the position detector 201 according to the present embodiment handles a pen detection period PP for detecting pen touch and a finger touch detection period PF for detecting finger touch alternately in a time shared manner as illustrated in FIG. 9.

The control circuit 403 switches between the multiplexer 401 and the finger touch/pen detection circuit 402 during the finger touch detection period PF and the pen detection period PP.

During the finger touch detection period PF, the control device section 400 detects the position touched by the finger by detecting the change in capacitance because each of the intersections of the sensor pattern of the sensor 300 undergoes a change in capacitance when touched by the finger. The sensor pattern has a grid configuration formed by arranging the X and Y conductors to intersect each other.

During the pen detection period PP, on the other hand, the control device section 400 detects the signal Sc transmitted from the position pointer 100 with the sensor 300. Then, the control device section 400 determines, on the basis of the information of the signal Sc received from the position pointer 100, whether the position pointer 100 hovers some distance or more such as 5 mm or more above the sensor surface 300S of the sensor 300, hovers in proximity and within a short distance of 5 mm or less from the sensor surface 300S of the sensor 300, or is in contact with the sensor surface 300S of the sensor 300. The control device section 400 generates a mode instruction signal to the position pointer 100 on the basis of the determination result and transmits the signal to the position pointer 100 via the wireless signal communication circuit.

Then, when the position pointer 100 is in proximity from the sensor surface 300S of the sensor 300, and when the position pointer 100 is in contact with the sensor surface 300S of the sensor 300, the position detector 201 receives the signal Sc from the position pointer 100 not only with the X conductor group 301 (first conductors: X conductors) but also with the Y conductor group 302 (second conductors: Y conductors). Then, the control device section 400 measures the level of the signal Sc transmitted from the position pointer 100 for each of the conductors making up the first and second conductors. The control device section 400 detects the position pointed to by the position pointer 100 on the sensor 300 by identifying each of the first and second conductors where the received signal is at high level.

Then, when the position pointer 100 is in contact with the sensor surface 300S of the sensor 300, the position detector 201 detects the writing pressure applied to the core body 3 of the position pointer 100 by receiving writing pressure data and detects the rotation and tilt angles of the position pointer 100.

Configuration Example of the Control Device Section 400 of the Position Detector 201

FIG. 10 illustrates an example of a configuration diagram of the control device section 400 of the position detector 201, showing a configuration example that focuses primarily on a pen detection circuit 402P. Therefore, the circuit of the configuration example shown in FIG. 10 is active during the pen detection period PP. The pen detection circuit 402P forms a first embodiment of the signal processor.

The pen detection circuit 402P in this example includes not only a conductor selection circuit 411, an amplification circuit 412, a bandpass filter circuit 413, a detection circuit 414, a sample/hold circuit 415, and an analog-digital conversion circuit (hereinafter referred to as an AD conversion circuit) 416 but also the control circuit 403 described above as illustrated in FIG. 10. The conductor selection circuit 411 is provided for the sensor 300.

Further, the pen detection circuit 402P has a wireless signal communication circuit 417 that is connected to the control circuit 403. The wireless signal communication circuit 417 is designed to wirelessly communicate with the wireless signal communication circuit 20 of the position pointer 100. In the present embodiment, a short-range wireless communication technique compliant with Bluetooth (registered trademark) standard is used.

The conductor selection circuit 411 makes up part of the multiplexer 401 described above. The amplification circuit 412, the bandpass filter circuit 413, the detection circuit 414, the sample/hold circuit 415, and the analog-digital conversion circuit 416 make up the pen detection circuit of the finger touch/pen detection circuit 402 described above.

The conductor selection circuit 411 selects one conductor from among the first conductors 301X1 to 301Xm and the second conductors 302Y1 to 302Yn on the basis of a control signal from the control circuit 403. The conductor selected by the conductor selection circuit 411 is connected to the amplification circuit 412, thus allowing the signal from the position pointer 100 to be detected from the selected conductor and amplified by the amplification circuit 412. The output of the amplification circuit 412 is supplied to the bandpass filter circuit 413, thus allowing only the frequency component of the signal transmitted from the position pointer 100 to be extracted.

The output signal of the bandpass filter circuit 413 is detected by the detection circuit 414. The output signal of the detection circuit 414 is supplied to the sample/hold circuit 415, sampled and held at a given time in synchronism with a sampling signal supplied from the control circuit 403, and converted to a digital value by the AD conversion circuit 416. Digital data from the AD conversion circuit 416 is read by the control circuit 403 and processed by the program stored in the ROM (read only memory) of the control circuit 403.

That is, the control circuit 403 operates in such a manner as to transmit a control signal to each of the sample/hold circuit 415, the AD conversion circuit 416, and the conductor selection circuit 411. Then, the control circuit 403 performs signal processing for detecting, from digital data supplied from the AD conversion circuit 416, hovering condition of the position pointer 100, position coordinates pointed to by the position pointer 100 on the sensor 300, and the angle information such as the rotation angle of the position pointer 100 and the tilt angle of the position pointer 100 relative to the sensor surface 300S of the sensor 300.

A description will be given next of the detection of hovering condition of the position pointer 100 by the control circuit 403.

As described above, the position pointer 100 transmits the signal Sc from all of the center electrode A and the surrounding electrodes B, C, and D in the hovering condition. Then, the position detector 201 receives the signal transmitted from the position pointer 100 using the sensor 300 for detection of hovering condition, and the control circuit 403 determines the reception conditions of the signals from the center electrode A and the surrounding electrodes B, C, and D of the position pointer 100 on the sensor surface 300S, thus determining whether or not the position pointer 100 hovers in proximity and within a given height (distance) from the sensor surface 300S. In this example, as described above, the term "in proximity and within a given height" refers, for example, to a distance of 5 mm to 1 cm or less, and, 5 mm or less in this example, between the sensor surface 300S and the tip of the core body 3 of the position pointer 100.

In the present embodiment, the control circuit 403 includes an object area detection circuit 4031, an object area emergence condition determination circuit 4032, and a determination result indication circuit 4033 as software processing functions of a software program for detection of hovering condition as illustrated in FIG. 10.

Here, the term "object area" refers to a sensing area formed on the sensor 300 by the signals transmitted from the center electrode A and the surrounding electrodes B, C, and D. In the description given below, the object areas formed on the sensor 300 by the signals transmitted from the center electrode A and the surrounding electrodes B, C, and D will be referred to as the object areas of the center electrode A and the surrounding electrodes B, C, and D, respectively, to facilitate the description.

Figure 11A:
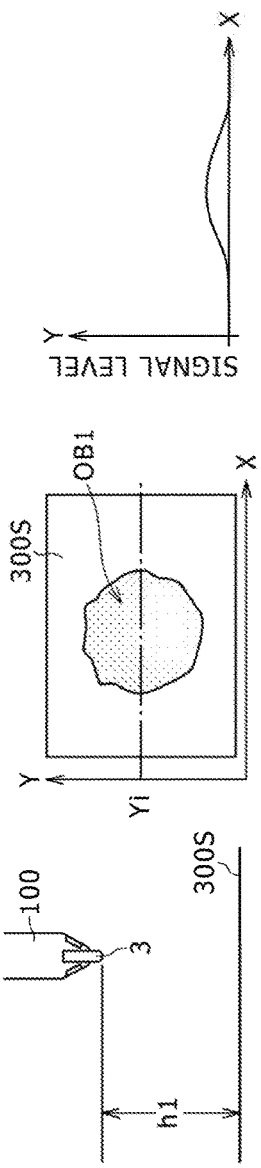
FIGS. 11A to 11C are diagrams used to describe processing operation of example components of the embodiment of the signal processor used together with the first embodiment of the position pointer according to the present disclosure.
Figure 11B:
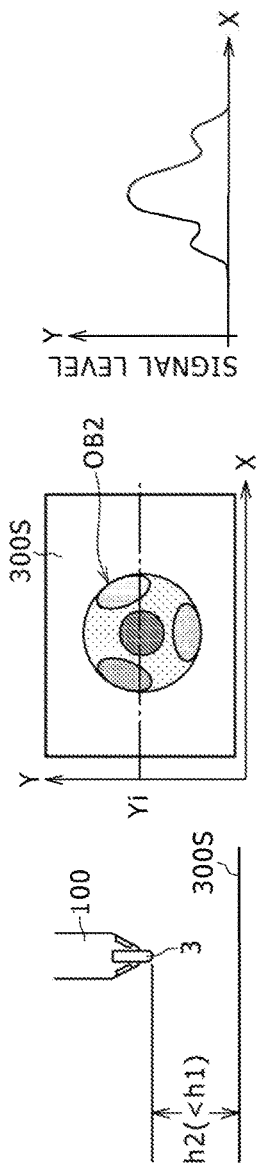
Figure 11C:
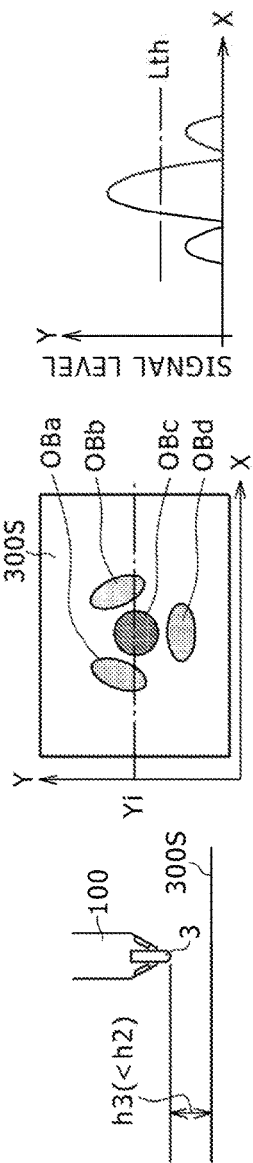

FIGS. 11A to 11C are diagrams for describing the change in the manner in which object areas emerge on the sensor 300 in accordance with the difference in distance of the tip 3a of the core body 3 of the position pointer 100 from the sensor surface 300S, showing, for convenience, a case in which the position pointer 100 is upright relative to the sensor surface 300S. The heights (distances) of the tip 3a of the core body 3 of the position pointer 100 from the sensor surface 300S are shown on the left in FIGS. 11A to 11C. The manner in which object areas formed on the sensor surface 300S at those times are shown in the middle. The signal level from the conductors of the sensor 300 detected by the control circuit 403 at those times is shown on the right. It should be noted that the signal level in FIGS. 11A to 11C represents the change in the direction of the X coordinate at a specific Y coordinate position Yi on the sensor surface 300S.

FIG. 11A illustrates a condition in which the tip 3a of the core body 3 of the position pointer 100 is located at a height h1 which is relatively far from the sensor surface 300S (third hovering condition) such as 10 cm or more away from the sensor surface 300S. An object area OB1 is formed on the sensor surface 300S. The object area OB1 is a cluster of object areas of the center electrode A and the surrounding electrodes B, C, and D as a whole with the object areas not separated from one another. Then, the signal level from the conductors of the sensor 300 detected by the control circuit 403 at this time is low as a whole.

FIG. 11B illustrates a condition in which the tip 3a of the core body 3 of the position pointer 100 is located at a height h2 (second hovering condition) which is lower than the height h1 but higher than a height h3 (e.g., 5 mm to 1 cm) in proximity from the sensor surface 300S. Similarly at this time, an object area OB2 which is a cluster of object areas of the center electrode A and the surrounding electrodes B, C, and D as a whole with the object areas not separated from one another, is formed on the sensor surface 300S. It should be noted, however, that at this time, the center electrode A and the surrounding electrodes B, C, and D may be identifiable from one another on the basis of the signal level from the conductors of the sensor 300 detected by the control circuit 403.

FIG. 11C illustrates a condition in which the tip 3a of the core body 3 of the position pointer 100 is located at the height h3 in proximity from the sensor surface 300S (first hovering condition) which is lower than the height h2. At this time, object areas OBa, OBb, OBc, and OBd respectively for the center electrode A and the surrounding electrodes B, C, and D are obtained on the sensor surface 300S, with these areas separated from one another. Then, the signal levels from the conductors of the sensor 300 detected by the control circuit 403 at this time are proportional to the object areas OBa, OBb, OBc, and OBd.

It should be noted that when the position pointer 100 is tilted at a given angle rather than upright relative to the sensor surface 300S, the object areas OBb, OBc, and OBd formed for the surrounding electrodes B, C, and D may partially overlap the object area OBa of the center electrode A. However, at least one of the object areas OBb, OBc, and OBd of the surrounding electrodes B, C, and D does not overlap the object area OBa of the center electrode A and is separated therefrom.

In the present embodiment, the control circuit 403 determines that the position pointer 100 is in proximity to the sensor surface 300S when the object area OBa for the center electrode A does not overlap and is separated from at least one of the object areas OBb, OBc, and OBd of the surrounding electrodes B, C, and D as illustrated in FIG. 11C.

It should be noted that the control circuit 403 may determine that the position pointer 100 is in proximity to the sensor surface 300S on the basis of not simply the fact that the object area OBa of the center electrode A does not overlap and is separated from at least one of the object areas OBb, OBc, and OBd of the surrounding electrodes B, C, and D. Instead, the control circuit 403 may determine that the position pointer 100 is in proximity to the sensor surface 300S when it is detected at the same time that the signal level obtained from the object area OBa of the center electrode A is equal to a given threshold level Lth or more. In this case, it is possible to change the height h3 of the tip 3a of the core body 3 of the position pointer 100 that is detected as being in proximity by changing the threshold level Lth.

The control circuit 403 detects the object areas formed by the signals transmitted from the position pointer 100 using the object area detection circuit 4031. Then, the object area emergence condition determination circuit 4032 verifies which of the three conditions shown in FIGS. 11A to 11C the manner in which the detected object areas have emerged matches, thus determining whether the detected object areas have emerged as illustrated in FIG. 11C. Then, the object area emergence condition determination circuit 4032 hands the determination result over to the determination result indication circuit 4033. The determination result indication circuit 4033 transmits instruction information, such as an instruction to select either the hovering mode or the position pointing mode, to the position pointer 100 via the wireless signal communication circuit 417 in accordance with the determination result received from the object area emergence condition determination circuit 4032.

It should be noted that, as described above, even if the determination result indication circuit 4033 determines that the position pointer 100 has changed from a state where it is instructed to select the position pointing mode to a state where it is instructed to select the hovering mode, the determination result indication circuit 4033 may not immediately transmit an instruction to the position pointer 100 to select the hovering mode. The determination result indication circuit 4033 transmits the instruction to the position pointer 100 to select the hovering mode when determining, for example, that a given period of time or more such as one second or more has elapsed after the position pointer 100 has changed to a state where it can be instructed to select the hovering mode from a state where it is instructed to select the position pointing mode.

A description will be given next of the operation performed by the pen detection circuit 402P of the position detector 201 for detecting the position pointed to by the position pointer 100, and the rotation and tilt angles of the position pointer 100.

In the present embodiment, the control circuit 403 includes a pointed position detection circuit 4034, a rotation angle detection circuit 4035, and a tilt angle detection circuit 4036 as software processing functions of a software program as illustrated in FIG. 10. The pointed position detection circuit 4034, the rotation angle detection circuit 4035, and the tilt angle detection circuit 4036 are controlled to be active when the position pointer 100 is instructed to select the position pointing mode, that is, when the position pointer 100 is in the first hovering condition in which the position pointer 100 is in proximity to the sensor surface 300S.

At this time, the position pointer 100 is, as described above, in the position pointing mode in response to an instruction from the position detector 201 to select the position pointing mode. In the position pointing mode, the signal Sc is always transmitted from the center electrode A, and selectively transmitted from the surrounding electrodes B, C, and D one after another. Then, the object areas OBa, OBb, OBc, and OBd formed respectively by the center electrode A and the surrounding electrodes B, C, and D can be detected separately from one another on the sensor surface 300S of the position detector 201 as illustrated in FIG. 11C.

Then, when the position pointer 100 is in the position pointing mode, the signal Sc includes identification information configured to identify the electrode that supplies the signal Sc. Therefore, the control circuit 403 of the pen detection circuit 402P can acquire reception signals from the object areas OBa, OBb, OBc, and OBd in such a manner that the reception signals are identifiable from one another by detecting the identification information.

The pointed position detection circuit 4034 of the control circuit 403 of the position pointer 100 detects the center-of-gravity position of the object area OBa of the center electrode A as a position pointed to by the position pointer 100 on the sensor 300. Here, the term "center-of-gravity position of the object area OBa" refers to a position calculated using the signal levels obtained from the plurality of conductors on the sensor 300 within the object area.

Figure 12A:
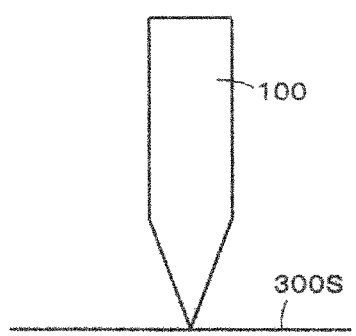
FIGS. 12A to 12D are diagrams used to describe processing operation of the example components of the embodiment of the signal processor used together with the first embodiment of the position pointer according to the present disclosure.
Figure 12B:
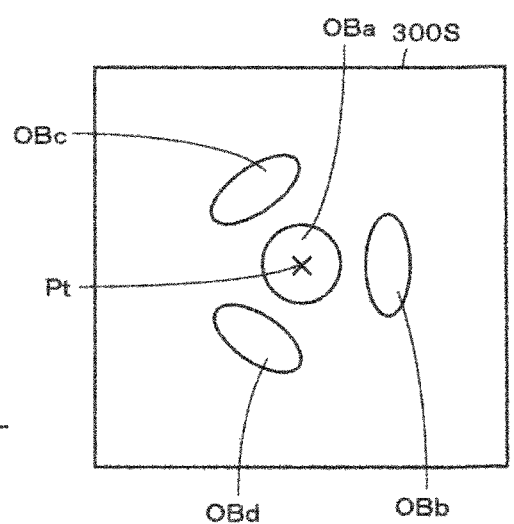
Figure 12C:
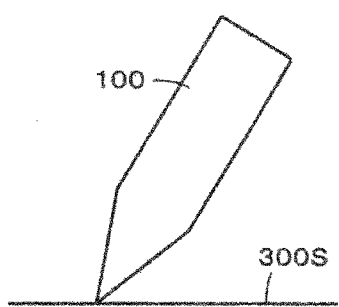
Figure 12D:
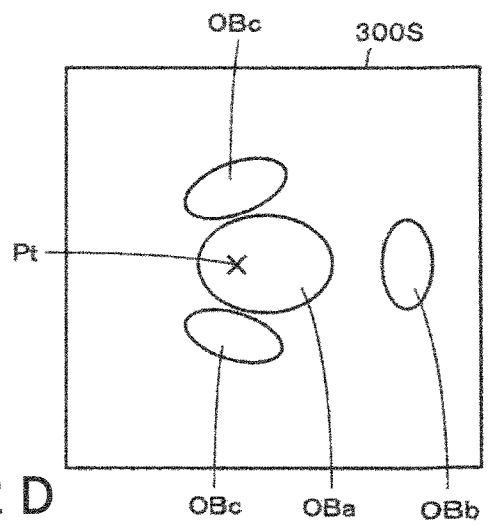

That is, when the position pointer 100 is vertical relative to the sensor surface 300S as illustrated in FIG. 12A, the object area OBa is in the shape of a perfect circle as illustrated in FIG. 12B, with a position Pt pointed to by the core body 3 of the position pointer 100 coinciding with the center of the object area OBa. In contrast, when the position pointer 100 is tilted as illustrated in FIG. 12C, the object area OBa on the sensor surface 300S is elliptical in shape as illustrated in FIG. 12D. Moreover, there is a discrepancy between the position Pt pointed to by the position pointer 100 and the center of the object area OBa.

However, the signal level obtained from the conductors on the sensor 300 included in the object area OBa is proportional to the position pointed to by the tip 3a of the core body 3. Therefore, an approximately correct position is obtained as a position pointed to by the position pointer 100. It should be noted that the same is true for the positions of the surrounding electrodes B, C, and D detected from the object areas OBb, OBc, and OBd.

In this example, the rotation angle detection circuit 4035 detects, for example, the Y-axis direction of the sensor surface 300S of the surrounding electrode B as a reference orientation. The rotation angle detection circuit 4035 acquires position coordinates (X0, Y0) of the center electrode A detected by the pointed position detection circuit 4034. Next, the rotation angle detection circuit 4035 detects position coordinates (X1, Y1) of the surrounding electrode B in the same manner as it does the position coordinates (X0, Y0) of the center electrode A. Then, the rotation angle detection circuit 4035 detects a rotation angle θ from the two sets of position coordinates (X0, Y0) and (X1, Y1).

Figure 13:
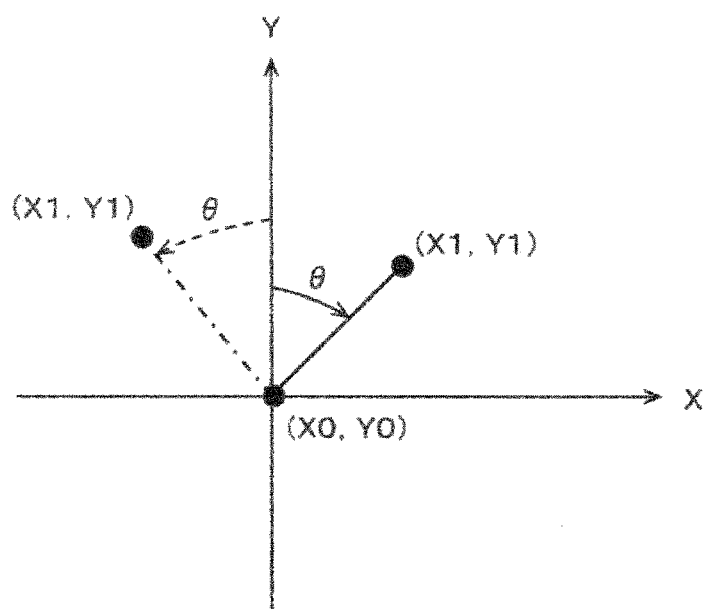
FIG. 13 is a diagram used to describe processing operation of the example components of the embodiment of the signal processor used together with the first embodiment of the position pointer according to the present disclosure.

FIG. 13 is a principle diagram for calculating the rotation angle θ about the axis vertical to the sensor surface 300S of the position pointer 100 when the two sets of position coordinates (X0, Y0) and (X1, Y1) are available. In FIG. 13, the positive direction of the Y axis is a reference (θ=0), and θ ranges from −180°<θ≤+180° to define the orientation of the surrounding electrode B for the position coordinates (X1, Y1). At this time, the rotation angle θ of the position pointer 100 is calculated by the rotation angle detection circuit 4035 using X0, Y0, X1, and Y1 and the following formulas (1) to (5).

[Formulas 1]

When $Y1 > Y0$, (1)
$$\theta = \tan^{-1}\left(\frac{X1 - X0}{Y1 - Y0}\right)$$

When $Y1 = Y0$ and $X1 > X0$ (2)
$$\theta = 90°$$

When $Y1 = Y0$ and $X1 < X0$ (3)
$$\theta = -90°$$

When $Y1 < Y0$ and $X1 \geq X0$ (4)
$$\theta = 180° + \tan^{-1}\left(\frac{X1 - X0}{Y1 - Y0}\right)$$

When $Y1 < Y0$ and $X1 < X0$ (5)
$$\theta = -180° + \tan^{-1}\left(\frac{X1 - X0}{Y1 - Y0}\right)$$

Next, in the present embodiment, the tilt angle detection circuit 4036 of the control circuit 403 finds the tilt angle of the position pointer 100 from the reception signal strengths obtained by receiving the signal Sc transmitted from the three surrounding electrodes B, C, and D of the position pointer 100. Either the signal level during detection of the X- or Y-axis coordinate value may be used as a reception signal strength. Here, the signal level during detection of the X-axis coordinate value will be used.

Figure 14:
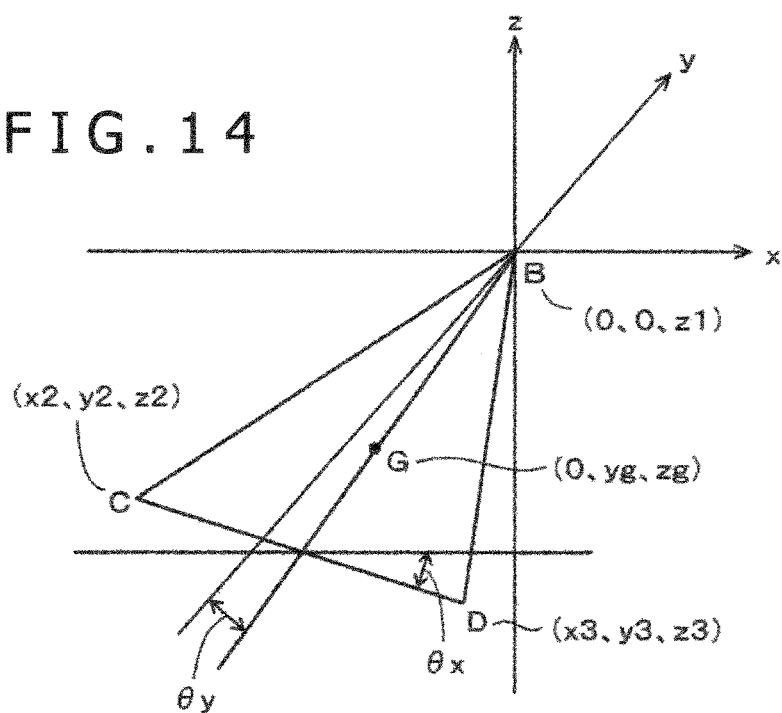
FIG. 14 is a diagram used to describe processing operation of the example components of the embodiment of the signal processor used together with the first embodiment of the position pointer according to the present disclosure.

FIG. 14 is a principle diagram for finding the tilt angle of the position pointer 100 using reception signal strengths V1, V2, and V3 obtained by receiving the signal Sc transmitted from the three surrounding electrodes B, C, and D. In FIG. 14, the coordinate axes are set so that the height direction of the position detector 201 from the sensor surface 300S is taken as the z axis, so that a center G of the equilateral triangle that includes, as points B, C, and D, those points corresponding to the positions of the surrounding electrodes B, C, and D of the position pointer 100 lies in the yz plane, and so that the point B corresponding to the position of the surrounding electrode B lies on the z axis. Letting the coordinates of the points B, C, D, and G be expressed as (0, 0, z1), (x2, y2, z2), (x3, y3, z3), and (0, yg, zg), respectively, the tilt angle (θx, θy) of the position pointer 100 is found by the following formulas (6) and (7).

[Formulas 2]

$$\sin\theta x = \frac{z2 - z3}{r} \quad (6)$$

(r: length of one side of the equilateral triangle)

$$\sin\theta y = \frac{2*z1 - z2 - z3}{r\sqrt{3}} \quad (7)$$

(Slope between point A and the midpoint between B and C)

Here, the distances (z1, z2, z3) from the sensor surface 300S to the points B, C, D, i.e., the tip positions of the three surrounding electrodes B, C, and D of the position pointer 100, are approximately inversely proportional to the reception signal strengths V1, V2, and V3. Therefore, That is expressed by formulas (8) and (9) shown below using a as a proportionality coefficient.

$$z1=\alpha/V1, z2=\alpha/V2, \text{ and } z3=\alpha/V3 \quad \text{[Formulas 3]}$$

Hence, θx and θy are found by the following formulas:

$$\theta x = \sin^{-1}\frac{\alpha(V3-V2)}{r \cdot V2 \cdot V3} \quad (8)$$

$$\theta y = \sin^{-1}\frac{\alpha(2 \cdot V2 \cdot V3 - V1 \cdot V3 - V1 \cdot V2)}{r \cdot V1 \cdot V2 \cdot V3 \cdot \sqrt{3}} \quad (9)$$

Here, α/r is a constant. Therefore, θx and θy can be found by the above relational formulas.

Figure 15:
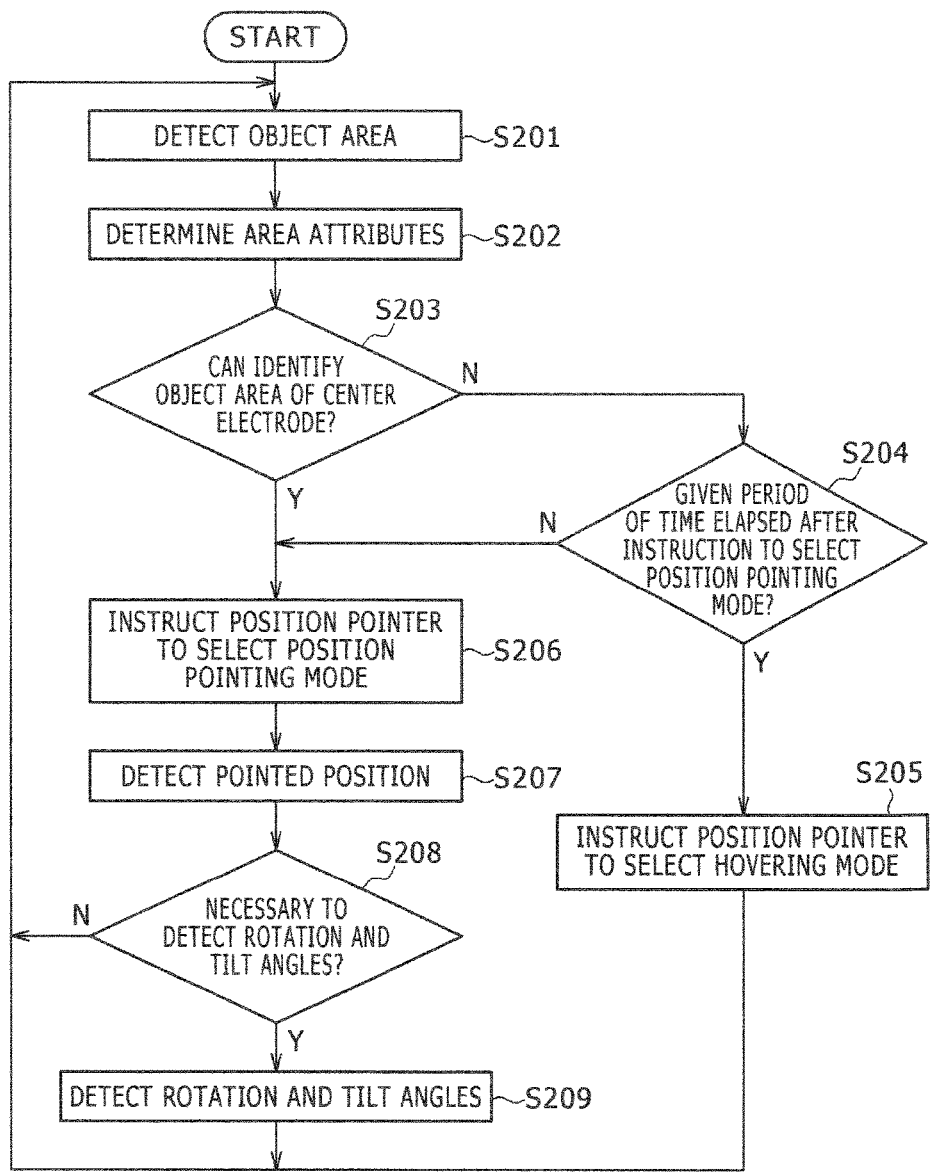
FIG. 15 is a diagram illustrating a flowchart for describing the flow of an example of processing operation of the example components of the embodiment of the signal processor used together with the first embodiment of the position pointer according to the present disclosure.

A description will be given next of an example of processing flow handled by the control circuit 403 configured as described above with reference to the flowchart shown in FIG. 15.

The control circuit 403 receives the signal Sc from the position pointer 100 via the conductor group of the sensor 300, thus detecting the object areas using the function of the object area detection circuit 4031 (step S201).

When the detection of object areas ends in step S201, the control circuit 403 verifies the manner in which object areas emerge on the sensor surface 300S using the function of the object area emergence condition determination circuit 4032, thus determining whether or not the object areas can be detected as separate areas. When the object areas can be detected as such, the control circuit 403 determines, for each of the object areas, an area attribute as to which of the object areas of the center electrode A and the surrounding electrodes B, C, and D the object area in question is (step S202).

Then, the control circuit 403 determines whether or not the object area of the center electrode A can be identified as an area separate from those of the surrounding electrodes B, C, and D using the function of the object area emergence condition determination circuit 4032 (step S203).

When the control circuit 403 determines in step S203 that it is difficult to identify the object area formed by the center electrode A as an area separate from those formed by the surrounding electrodes B, C, and D, the control circuit 403 determines using the function of the object area emergence condition determination circuit 4032 whether or not a given period of time such as one second has elapsed after the previous transmission of an instruction to the position pointer 100 to select the position pointing mode (step S204).

If the control circuit 403 determines in step S204 that the given period of time or more has elapsed after the previous transmission of an instruction to select the position pointing mode, the control circuit 403 transmits an instruction to the position pointer 100 to select the hovering mode by means of a wireless signal via the wireless signal communication circuit 417 using the function of the determination result indication circuit 4033 (step S205). After step S205, the control circuit 403 returns the process to step S201 to repeat the processes from step S201 onward.

On the other hand, when the control circuit 403 determines in step S203 that the object area formed by the center electrode A can be identified as an area separate from those formed by the surrounding electrodes B, C, and D, the control circuit 403 transmits an instruction to the position pointer 100 to select the position pointing mode by means of a wireless signal via the wireless signal communication circuit 417 using the function of the determination result indication circuit 4033 (step S206). If the control circuit 403 determines in step S204 that the given period of time or more has yet to elapse after the previous transmission of an instruction to select the position pointing mode, the control circuit 403 also proceeds to step S206 and transmits an instruction to the position pointer 100 to select the position pointing mode by means of a wireless signal via the wireless signal communication circuit 417.

After the transmission of an instruction to the position pointer 100 to select the position pointing mode in step S206, the control circuit 403 detects the position coordinates pointed to by the position pointer 100 on the sensor 300 using the function of the pointed position detection circuit 4034 as described above (step S207).

Next, the control circuit 403 determines whether or not it is necessary to detect the rotation and tilt angles of the position pointer 100 as a function of the electronic device which has or is connected to the position detector 201 (step S208). When the control circuit 403 determines that it is not necessary to do so, the control circuit 403 returns the process to step S201 to repeat the processes from step S201 onward.

On the other hand, when the control circuit 403 determines in step S208 that it is necessary to detect the rotation and tilt angles of the position pointer 100, the control circuit 403 detects the rotation and tilt angles of the position pointer 100 as described above using the functions of the rotation angle detection circuit 4035 and the tilt angle detection circuit 4036 (step S209). Then, the control circuit 403 returns the process to step S201 to repeat the processes from step S201 onward.

It should be noted that the position pointer 100 places itself into the hovering mode when no instruction is received from the pen detection circuit 402P of the position detector 201 to select the position pointing mode or the hovering mode.

Effect According to the First Embodiment

In the position pointer 100 according to the above described first embodiment, an AC signal is transmitted from all of the center electrode A and the surrounding electrodes B, C, and D in the hovering mode. This ensures that the signal transmitted to the sensor 300 of the position detector 201 has a large energy, thus making it easy for the position detector 201 to detect the position pointer 100 in the hovering condition.

Moreover, in the above embodiment, the AC signal supplied to the center electrode A and the surrounding electrodes B, C, and D in the hovering mode has a larger amplitude than in the position pointing mode. This also contributes to the ease with which the position detector 201 can detect the hovering condition of the position pointer 100. Then, even if the AC signal has a larger amplitude, the increase in power consumption is kept to a minimum thanks to intermittent transmission of the AC signal from the position pointer 100.

Then, the position detector 201 identifies the hovering condition of the position pointer 100 over the sensor surface 300S of the sensor 300 of the position detector 201 on the basis of the signal received from the position pointer 100. When the position pointer 100 hovers sufficiently in proximity to the sensor surface 300S of the sensor 300 of the position detector 201, the position detector 201 transmits an instruction to the position pointer 100 to select the position pointing mode. This allows the position detector 201 to detect the pointed position from when the position pointer 100 is not in contact with and hovers over the sensor surface 300S. This also allows for detection of the rotation and tilt angles of the position pointer 100.

Modification Example of the First Embodiment

It should be noted that although, in the above described first embodiment, two instructions, one to select the hovering mode and another to select the position pointing mode, are transmitted to the position pointer 100 from the pen detection circuit 402P of the position detector 201, an instruction to select the hovering mode may be not transmitted so that when a position pointer 100A is at a given height (distance) in proximity to the sensor surface 300S, an instruction is transmitted via the sensor 300 to the position pointer 100A to select the position pointing mode, and so that if the position pointer 100A remains at a height which is not the given height in proximity to the sensor surface 300S for a given period of time such as one second, an instruction is transmitted to the position pointer 100A to cancel the position pointing mode.

It should be noted that, in the above embodiment, the signal Sc is transmitted from the position pointer 100 in the position pointing mode so that the signal Sc includes two-bit identification information for identifying the surrounding electrodes B, C, and D that are supplied with the signal Sc generated by the signal generation circuit 12 as is the center electrode A. However, the technique for identifying the surrounding electrodes B, C, and D that are supplied with the signal Sc as is the center electrode A is not limited to the technique for including two-bit identification information in the signal Sc.

In the above embodiment, for example, writing pressure data is included in the signal Sc supplied to the center electrode A and the surrounding electrode B, but not in the signal Sc supplied to the center electrode A and the surrounding electrode C or that supplied to the center electrode A and the surrounding electrode D. Then, the surrounding electrodes B, C, and D are switched in a determined order such as from the surrounding electrode B to the surrounding electrode C to the surrounding electrode D. Therefore, the position detector 201 can identify that the center electrode A and the surrounding electrode B are selected by the position pointer 100 when receiving the signal Sc that includes writing pressure data. Then, it is possible to identify that the burst signal of the signal Sc in the next time period is transmitted from the center electrode A and the surrounding electrode C, and that the burst signal of the signal Sc in the next time period is transmitted from the center electrode A and the surrounding electrode D.

Further, by the same token, it is possible to identify that the center electrode A and the surrounding electrode B are selected by the position pointer 100 on the basis of the difference in length between the time period during which the signal Sc is transmitted from the center electrode A and the surrounding electrode B and those during which the signal Sc is transmitted from the center electrode A and the surrounding electrode C or from the center electrode A and the surrounding electrode D, thus making it possible to identify, from the identification result, that the center electrode A and the surrounding electrode C and the center electrode A and the surrounding electrode D are selected by the position pointer 100.

That is, in a word, if the surrounding electrodes B, C, and D are switched from one to another in the order from the surrounding electrode B to the surrounding electrode C to the surrounding electrode D, it is only necessary to identify one of the surrounding electrodes which is supplied with the signal Sc as is the center electrode A. For example, therefore, the time period during which the signal Sc is transmitted from the center electrode A and the surrounding electrode B may be rendered identifiable by providing a given length of signal interruption period or inserting a given signal that is identifiable from other signals rather than providing an interruption period only after the time period during which the signal Sc is transmitted from the center electrode A and the surrounding electrode B. Any other technique may also be used to identify one of the surrounding electrodes which is supplied with the signal Sc as is the center electrode A.

Further, in each hovering condition detection process of the above embodiment, the object area emergence condition determination circuit 4032 determines the condition in which the tip 3a of the core body 3 of the position pointer 100 is in proximity to the sensor surface 300S of the position detector 201 on the basis of whether or not the center electrode A can be identified from the surrounding electrodes B, C, and D. However, the object area emergence condition determination circuit 4032 may determine the condition on the basis of whether or not the object area formed by other electrode rather than the center electrode A or the object areas formed by not only the center electrode A but also the surrounding electrodes B, C, and D can be identified from one another.

Still further, the object area emergence condition determination circuit 4032 may determine the condition in which the tip 3a of the core body 3 of the position pointer 100 is in proximity to the sensor surface 300S of the position detector 201 on the basis of whether or not the object area of the center electrode A and/or those of the surrounding electrodes B, C, and D are of a given size.

Second Embodiment

In the first embodiment, instructions to select the hovering mode and the position pointing mode, i.e., determination results from the determination result indication circuit 4033 of the pen detection circuit 402P of the position detector 201, are transmitted to the position pointer 100 via the wireless signal communication circuits 417 and 20. However, instructions to select the hovering mode and the position pointing mode from the pen detection circuit 402P of the position detector 201 can be transmitted from the sensor 300 of the position detector 201 via the center electrode A (core body 3) of the position pointer 100. The second embodiment is an example thereof.

Figure 16:
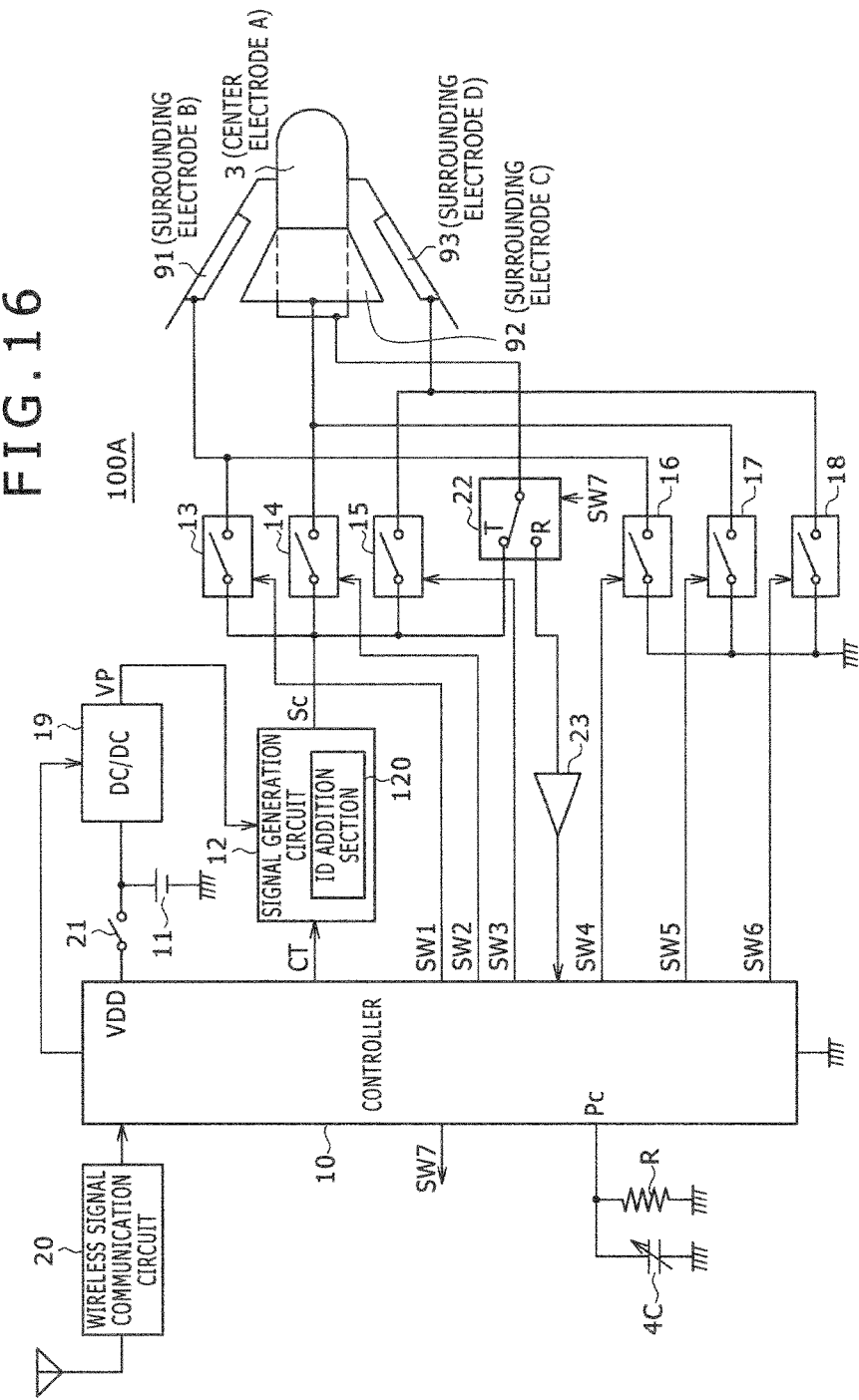
FIG. 16 is a block diagram illustrating a configuration example of a signal processing circuit of a second embodiment of the position pointer according to the present disclosure.

FIG. 16 illustrates a configuration example of a signal processing circuit of the position pointer 100A according to the second embodiment. In FIG. 16, the same components as those of the position pointer 100 according to the first embodiment shown in FIG. 3 are denoted by the same reference symbols, and the detailed description thereof will be omitted.

In the second embodiment, a selector switch circuit 22 is provided, and the common contact terminal thereof is connected to the center electrode A (core body 3) as illustrated in FIG. 16. Then, a fixed contact terminal T of the selector switch circuit 22 is connected to the output end of the signal generation circuit 12, other fixed contact terminal R is connected to the signal reception terminal of the controller 10 via a reception amplifier 23. Then, the controller 10 supplies a switching control signal SW7 to the selector switch circuit 22. The position pointer 100A is configured in the same manner as the position pointer 100 according to the first embodiment as illustrated in FIG. 3 in all other respects. It should be noted that the controller 10 transmits only identification information of the position pointer 100A to the position detector 201 via the wireless signal communication circuit 20 in the second embodiment.

In the position pointer 100A according to the second embodiment, the controller 10 connects the selector switch circuit 22 to the fixed contact terminal T using the switching control signal SW7 in the hovering mode during the intermittent burst signal transmission period shown in FIGS. 6A to 6H. After the intermittent transmission of a burst signal, on the other hand, the controller 10 switches the selector switch circuit 22 over to connect to the fixed contact terminal R for a time period long enough to receive a signal from the sensor 300.

In the position pointing mode, on the other hand, the controller 10 connects the selector switch circuit 22 to the fixed contact terminal R using the switching control signal SW7 for a time period long enough to receive a signal from the sensor 300 at appropriate intermittent timings such as after the burst signal transmission period shown in FIG. 5E. In other time periods, the controller 10 switches the selector switch circuit 22 over to connect to the fixed contact terminal T.

On the other hand, the pen detection circuit 402P of the position detector 201 transmits, to the position pointer 100A, information about an instruction to select the hovering mode or the position pointing mode from the determination result indication circuit 4033 via the sensor 300 on the basis of the burst signal received from the position pointer 100A. The pen detection circuit 402P does so starting from when the reception of the burst signal is interrupted.

The controller 10 of the position pointer 100A places the position pointer 100A in the hovering mode when an instruction is received from the position detector 201 to select the hovering mode and when no signal is received from the position detector 201. Then, the controller 10 switches the position pointer 100A to the position pointing mode when an instruction is received from the position detector 201 to select the position pointing mode.

It should be noted that, in the case of the second embodiment, the pen detection circuit 402P of the position detector 201 may not transmit an instruction to select the hovering mode, that the pen detection circuit 402P may transmit an instruction to select the position pointing mode via the sensor 300 to the position pointer 100A when the position pointer 100A reaches a height (distance) in proximity to the sensor surface 300S, and that the pen detection circuit 402P may transmit an instruction to cancel the position pointing mode to the position pointer 100A if the position pointer 100A remains at a height (distance) not in proximity to the sensor surface 300S for a given period of time such as one second or more.

Third Embodiment

In the position pointer 100 according to the above described first embodiment, the core body 3 serving as the center electrode A is always supplied with the signal Sc that is generated by the signal generation circuit 12. However, the signal Sc may be selectively supplied not only to the three electrode pieces 91, 92, and 93 serving respectively as the surrounding electrodes B, C, and D but also to the center electrode A. A position pointer 100B according to a third embodiment is an example of a position pointer configured in that manner.

FIG. 17 is a block diagram illustrating a configuration example of a signal processing circuit of the position pointer 100B according to the third embodiment. In FIG. 17, the same components as those of the position pointer 100 according to the first embodiment shown in FIG. 3 are denoted by the same reference symbols, and the detailed description thereof will be omitted.

In the position pointer 100B according to the third embodiment, the signal Sc from the signal generation circuit 12 is supplied to the center electrode A (core body 3) via a switching circuit 24 as illustrated in FIG. 17. Further, the center electrode A is coupled to a ground node via a switching circuit 25. Then, the switching circuits 24 and 25 are each controlled to turn ON or OFF by switching control signals SW8 and SW9 from the controller 10. The switching control signals SW8 and SW9 are opposite in phase to each other. The position pointer 100B is configured in the same manner as the position pointer 100 according to the first embodiment illustrated in FIG. 3 in all other respects.

In the position pointer 100B according to the third embodiment, the controller 10 turns ON the switching circuits 13 to 15 and 24 and turns OFF the switching circuits 16 to 18 and 25 in the hovering mode, thus supplying the AC signal for the hovering mode generated by the signal generation circuit 12 to all of the center electrode A and the surrounding electrodes B, C, and D as illustrated in FIG. 18A as does the position pointer 100 according to the first embodiment. In this case, the AC signal for the hovering mode supplied from the signal generation circuit 12 to all of the center electrode A and the surrounding electrodes B, C, and D is transmitted intermittently as illustrated in FIGS. 6A to 6D.

Alternatively, also in this case, the AC signal may be supplied from the signal generation circuit 12 always to the center electrode A, and selectively to the surrounding electrodes B, C, and D one after another as illustrated in FIGS. 6E to 6H. Still alternatively, the AC signal may be supplied only to the surrounding electrodes B, C, and D as illustrated in FIGS. 6B to 6D or FIGS. 6F to 6H, but not to the center electrode A.

The position detector 201 according to the third embodiment can detect the hovering condition on the basis of the signal received from the position pointer 100B in the same manner as described in the first embodiment.

In the position pointer 100B according to the third embodiment, the controller 10 controls the switching circuits 13 to 15 and 24 to turn ON or OFF using the switching control signals SW1 to SW3 (refer to FIGS. 18E to 18G) and the switching control signal SW8 (refer to FIG. 18D) in the position pointing mode, thus switching the time period during which the signal Sc generated by the signal generation circuit 12 is transmitted in the order from a time period TA of the center electrode A to a time period TB' of the surrounding electrode B, to a time period TC' of the surrounding electrode C, and to a time period TD' of the surrounding electrode D as illustrated in FIG. 18B.

Then, during the time period TA in which the signal Sc generated by the signal generation circuit 12 is transmitted to the center electrode A via the switching circuit 24 using the switching control signals SW1 to SW3 and SW8, the switching circuit 25 is controlled to turn OFF by the switching control signal SW9, and the switching circuits 16 to 18 are controlled to turn ON by the switching control signals SW4 to SW6, thus grounding all the surrounding electrodes B, C, and D in synchronism with the transmission of the signal Sc to the center electrode A. That is, when the position pointed to by the position pointer 100B is detected by transmitting the signal Sc to the center electrode A, the surrounding electrodes B, C, and D are coupled to a ground node. This minimizes the impact of visual perception error caused by improper detection of the position pointed to by the position pointer 100B as a result of capacitive coupling between the surrounding electrodes B, C, and D and the sensor 300.

Then, in the example of the third embodiment, the signal Sc that is transmitted during each of the time period TA of the center electrode A and the time periods TB', TC', and TD' of the surrounding electrodes B, C, and D is all made up of two periods, namely, a burst signal transmission period and a writing pressure data transmission period described above in the same manner as illustrated in FIG. 18C. After each burst signal transmission period, two-bit identification information is added as illustrated in FIG. 5E.

The position detector 201 according to the third embodiment can detect the hovering condition, pointed position and rotation and tilt angles almost in the same manner as described in the above described first embodiment. Therefore, the description thereof will be omitted.

It should be noted that although, in the description of the above described third embodiment, identification information is added to the signal Sc transmitted during each of the time period TA of the center electrode A and the time periods TB', TC', and TD' of the surrounding electrodes B, C, and D to allow the position detector 201 to identify the time periods TA, TB', TC', and TD', the time periods TA, TB', TC', and TD' can also be identified by the position detector 201 without adding identification information to the signal Sc if done so in the third embodiment as described with reference to the modification example of the first embodiment.

Fourth Embodiment

In the position pointer 100 according to the above described first embodiment, a signal at the same frequency f1 is supplied to the center electrode A and the surrounding electrodes B, C, and D. However, a signal supplied to the center electrode A and that supplied to the surrounding electrodes B, C, and D may differ in frequency. A position pointer 100C according to a fourth embodiment is an example of a position pointer configured in that manner.

Figure 19:
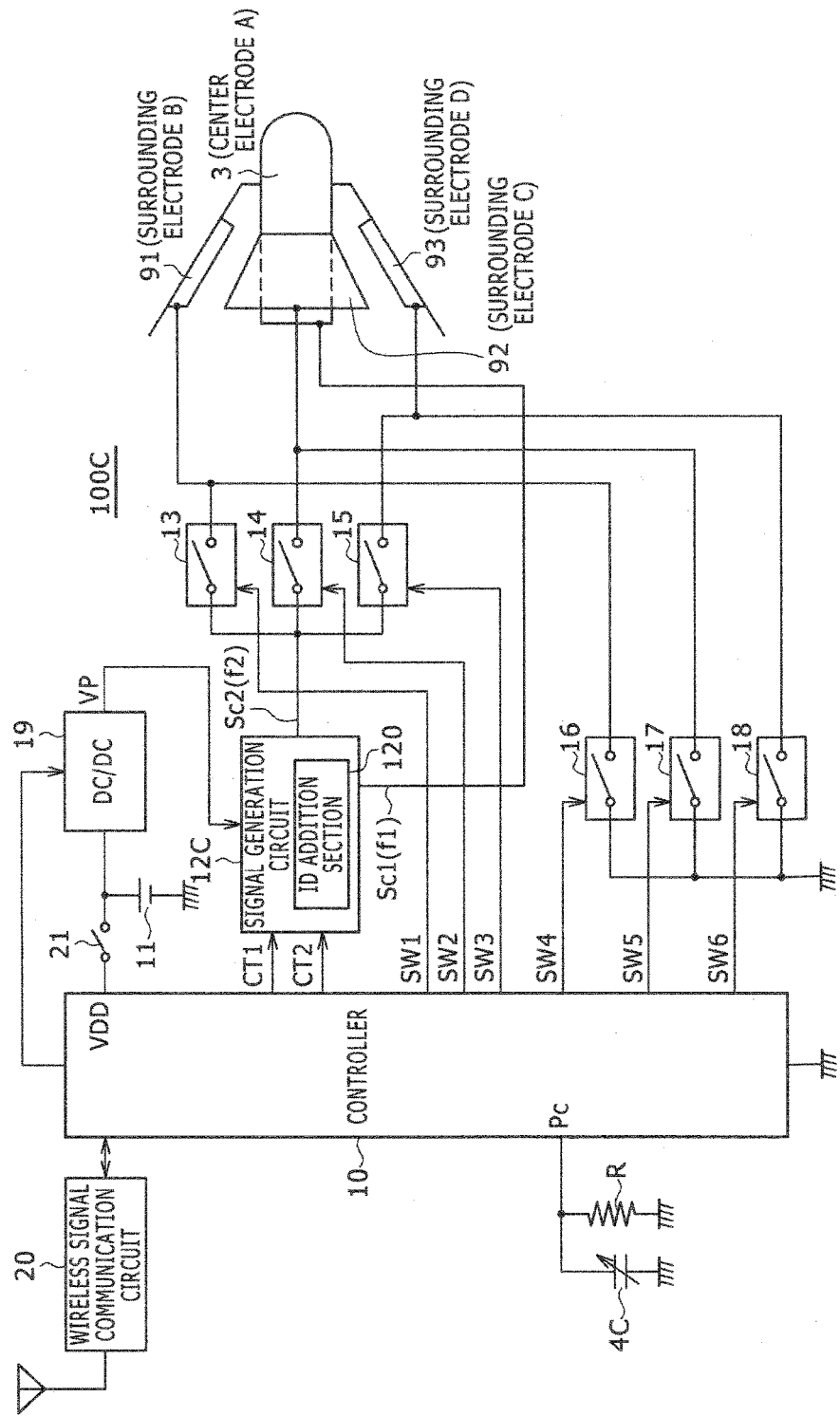
FIG. 19 is a block diagram illustrating a configuration example of a signal processing circuit of a fourth embodiment of the position pointer according to the present disclosure.

FIG. 19 is a block diagram illustrating a configuration example of a signal processing circuit of the position pointer 100C according to the fourth embodiment. In FIG. 19, the same components as those of the position pointer 100 according to the first embodiment shown in FIG. 3 are denoted by the same reference symbols, and the detailed description thereof will be omitted.

The oscillation circuit included in a signal generation circuit 12C according to the fourth embodiment generates two signals, one at the frequency f1 and another at a frequency f2. Then, the controller 10 supplies two control signals, a control signal CT1 and a control signal CT2, to the signal generation circuit 12C. The control signal CT1 controls the oscillation of the signal at the frequency f1. The control signal CT2 controls the oscillation of the signal at the frequency f2.

Then, a signal Sc1(f1) at the frequency f1 from the signal generation circuit 12C is always supplied to the center electrode A. On the other hand, a signal Sc2(f2) at the frequency f2 from the signal generation circuit 12C is supplied to each of the surrounding electrodes B, C, and D via the switching circuits 13 to 15. The configuration is similar to that of the position pointer 100 according to the first embodiment illustrated in FIG. 3 in all other respects.

Figure 20:
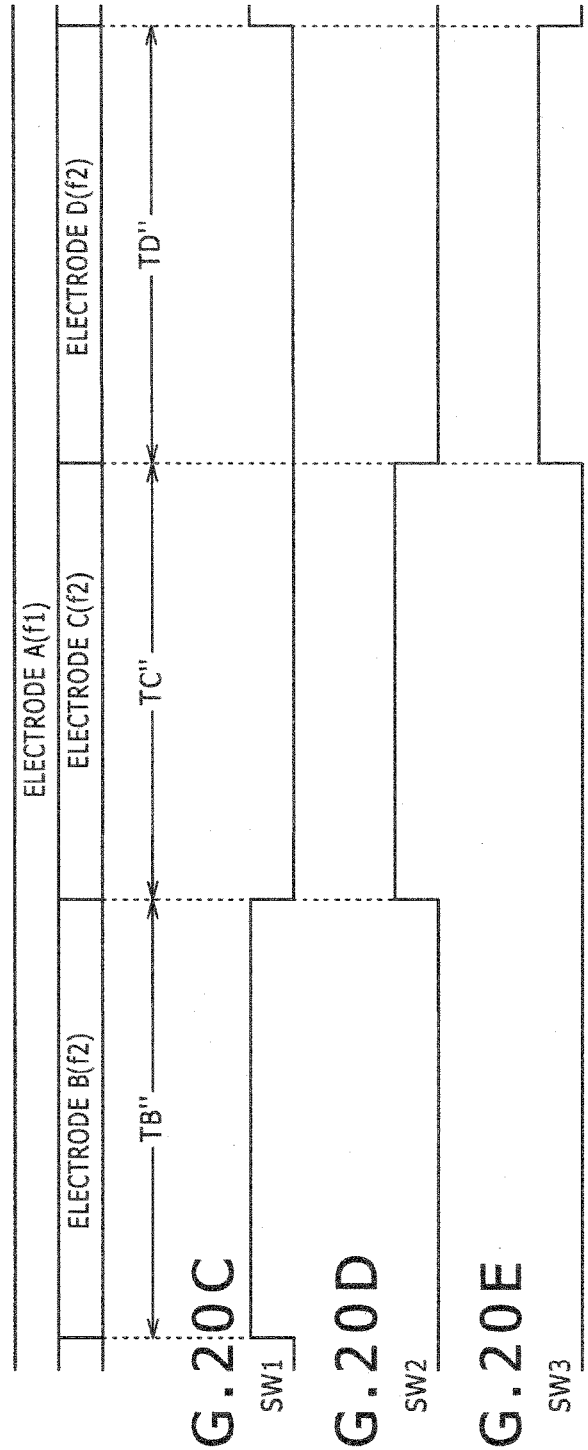
FIGS. 20A to 20E are diagrams illustrating timing charts for describing an operation of the signal processing circuit of the fourth embodiment of the position pointer according to the present disclosure.

In the position pointer 100C according to the fourth embodiment, the controller 10 turns ON the switching circuits 13 to 15 and turns OFF the switching circuits 16 to 18 in the hovering mode, thus supplying the AC signal for the hovering mode generated by the signal generation circuit 12 to all of the center electrode A and the surrounding electrodes B, C, and D as illustrated in FIG. 20A as does the position pointer 100 according to the first embodiment.

The position detector 201 according to the fourth embodiment can detect the hovering condition on the basis of the signal received from the position pointer 100C in the same manner as described in the first embodiment. It should be noted, however, that a signal at the frequency f1 is supplied from the center electrode A, and a signal at the frequency f2 from the surrounding electrodes B, C, and D in the fourth embodiment. This allows the position detector 201 to process the signal received from the center electrode A and those received from the surrounding electrodes B, C, and D separately by taking advantage of the difference in frequency.

During detection of the object areas formed by the center electrode A and the surrounding electrodes B, C, and D to detect the above hovering condition, therefore, the position detector 201 can detect the object area formed by the center electrode A and those formed by the surrounding electrodes B, C, and D separately.

It should be noted that, in the fourth embodiment, the AC signal for the hovering mode supplied from the signal generation circuit 12C to the center electrode A and the surrounding electrodes B, C, and D is also transmitted intermittently as illustrated in FIGS. 6A to 6D.

Alternatively, also in this case, the AC signal may be supplied from the signal generation circuit 12C always to the center electrode A, and selectively to the surrounding electrodes B, C, and D one after another as illustrated in FIGS. 6E to 6H. Still alternatively, the AC signal may be supplied only to the surrounding electrodes B, C, and D as illustrated in FIGS. 6B to 6D or FIGS. 6F to 6H, but not to the center electrode A.

In the position pointer 100C according to the fourth embodiment, the controller 10 supplies the signal Sc1(f1) generated by the signal generation circuit 12C always to the center electrode A in the position pointing mode as illustrated in FIG. 20B. Further, the controller 10 controls the switching circuits 13 to 15 to turn ON or OFF using the switching control signals SW1 to SW3 (refer to FIGS. 20C to 20E), thus switching, in this example, the time period during which the signal Sc2(f2) generated by the signal generation circuit 12C is transmitted in the order from a time period TB" of the surrounding electrode B, to a time period TC" of the surrounding electrode C, and to a time period TD" of the surrounding electrode D as illustrated in FIG. 20B.

Then, in the position pointing mode, the position pointer 100C according to the fourth embodiment repeatedly transmits, from the center electrode A, a burst signal transmission period and a writing pressure data transmission period that are shown as a transmission signal during the time period TB illustrated in FIG. 5E.

The position detector 201 extracts the frequency f1 component from the signal received from the position pointer 100C and processes the extracted component using the pointed position detection circuit 4034 of the control circuit 403, thus detecting the position pointed to by the position pointer 100C.

Further, in the position pointer 100C according to the fourth embodiment, the signal Sc2(f2) supplied to each of the surrounding electrodes B, C, and D during the time periods TB", TC", and TD" of these surrounding electrodes B, C, and D includes two-bit identification information that is added after the burst signal transmission period shown in FIG. 5E as a signal transmitted during the time periods TC and TD.

The position detector 201 extracts the frequency f2 component from the signal received from the position pointer 100C and processes the extracted component using the rotation angle detection circuit 4035 and the tilt angle detection circuit 4036 of the control circuit 403, thus detecting the rotation and tilt angles of the position pointer 100C.

It should be noted that although, in the description of the above described fourth embodiment, identification information is added to the signal Sc transmitted during each of the time periods TB", TC", and TD" of the surrounding electrodes B, C, and D to allow the position detector 201 to identify the time periods TB", TC", and TD", the time periods TB", TC", and TD" can be also identified by the position detector 201 without adding identification information to the signal Sc if done so in the fourth embodiment as described with reference to the modification example of the first embodiment.

Fifth Embodiment

In the position pointer 100C according to the above described fourth embodiment, the signal Sc1(f1) generated by the signal generation circuit 12 is always supplied to the core body 3 serving as the center electrode A. However, the signals Sc1(f1) and Sc2(f2) may be selectively supplied not only to the electrode pieces 91, 92, and 93 serving respectively as the surrounding electrodes B, C, and D but also to the center electrode A. A position pointer 100D according to a fifth embodiment is an example of a position pointer configured in that manner, and has the relation with the fourth embodiment as with the relation between the first embodiment and the third embodiment in which only the signal Sc at the frequency f1 is used.

Figure 21:
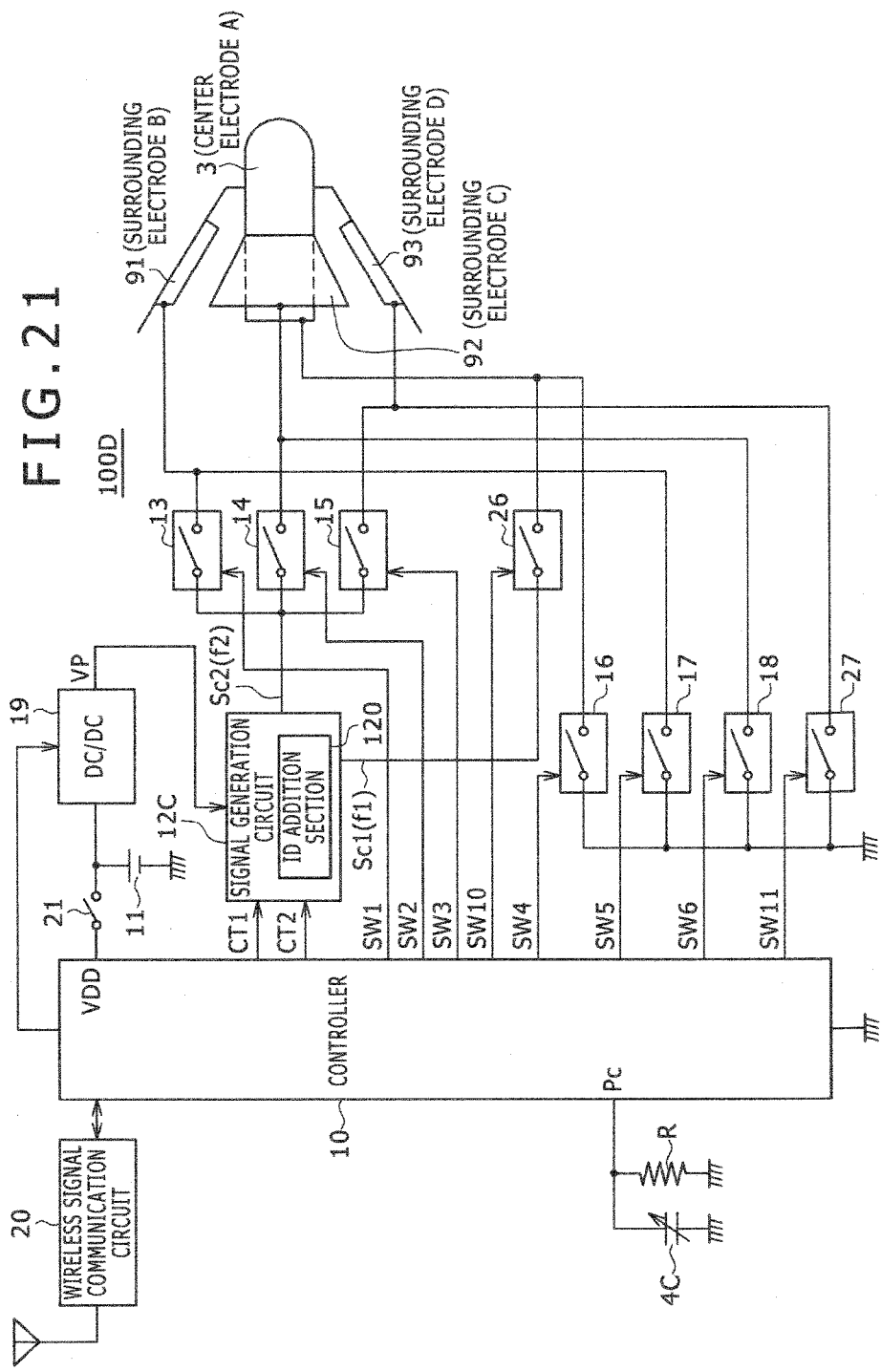
FIG. 21 is a block diagram illustrating a configuration example of a signal processing circuit of a fifth embodiment of the position pointer according to the present disclosure.

FIG. 21 is a block diagram illustrating a configuration example of a signal processing circuit of the position pointer 100D according to the fifth embodiment. In FIG. 21, the same components as those of the position pointer 100C according to the fourth embodiment shown in FIG. 19 are denoted by the same reference symbols, and the detailed description thereof will be omitted.

In the signal processing circuit of the position pointer 100D according to the fifth embodiment, the signal Sc1(f1) at the frequency f1 from the signal generation circuit 12C is supplied to the center electrode A (core body 3) via a switching circuit 26 as illustrated in FIG. 21. Then, the center electrode A (core body 3) is coupled to a ground node via a switching circuit 27.

Then, the switching circuits 26 and 27 are each controlled to turn ON or OFF by switching control signals SW10 and SW11 from the controller 10. The switching control signals SW10 and SW11 are opposite in phase to each other. The configuration is similar to that of the position pointer 100C according to the fourth embodiment in all other respects.

The position pointer 100D according to the fifth embodiment operates in the same manner as the position pointer 100C according to the fourth embodiment, except that the signal Sc1(f1) generated by the signal generation circuit 12C is selectively supplied to the center electrode A of the position pointer 100D in the fifth embodiment, as compared with the fourth embodiment in which the signal Sc1(f1) is always supplied to the center electrode A. Therefore, the description thereof will be omitted. It should be noted that FIGS. 22A to 22G illustrate timing charts for the position pointer 100D according to the fifth embodiment which corresponds to the timing chart for the position pointer 100B according to the third embodiment illustrated in FIGS. 18A to 18G.

Then, similarly, the position detector 201 according to the fifth embodiment operates in the same manner as that according to the third embodiment except that the signal component from the center electrode A and those from the surrounding electrodes B, C, and D are separated in frequency for processing. Here, the description thereof will be omitted.

Other Embodiment or Modification Example

It should be noted that although, in the position pointers according to the above embodiments, the second electrode includes three electrode pieces (surrounding electrodes), three or more electrode pieces may be provided.

Further, although, in the position pointers according to the above embodiments, the electrode pieces 91, 92, and 93 (surrounding electrodes B, C, and D) making up the second electrode configured to transmit signals are provided on the inner perimeter surface of the housing 1, these electrodes may be formed on the outer perimeter wall surface of the housing 1.

It should be noted that although, in the position pointers according to the above embodiments, the second electrode (surrounding electrode) is divided into a plurality of pieces, an annular second electrode may be provided which entirely surrounds the core body (center electrode).

It is to be noted that the embodiment of the present disclosure is not limited to the foregoing embodiments, and that various changes can be made without departing from the spirit of the present disclosure.

What is claimed is:

1. A position pointer configured to point to a position on a sensor coupled to a position detector, the position pointer comprising:
   a signal generation circuit arranged in a pen-shaped housing and configured to generate transmission signals;
   a first electrode arranged at a first position of the pen-shaped housing along an axial center direction and configured to be capacitively coupled with the sensor;
   a second electrode arranged at a second position different from the first position off the axial center direction of the pen-shaped housing and configured to be capacitively coupled with the sensor; and
   a signal supply control circuit, which is coupled to the signal generation circuit and which:
      in response to a first control signal transmitted from the position detector in a first operation mode, supplies the transmission signals at a first level to the first electrode to be transmitted therefrom to the position detector, and
      in response to a second control signal transmitted from the position detector in a second operation mode, supplies the transmission signals at a second level greater than the first level to the second electrode to be transmitted therefrom to the position detector.

2. The position pointer of claim 1, wherein the first operation mode is a position pointing mode and the second operation mode is a hovering mode.

3. The position pointer of claim 1, wherein, in the second operation mode the transmission signals at the second level are intermittently supplied to the second electrode to be transmitted therefrom to the position detector.

4. The position pointer of claim 1, wherein, in the first operation mode the transmission signals at the first level are supplied additionally to the second electrode to be transmitted therefrom to the position detector.

5. The position pointer of claim 1, wherein, the second electrode includes electrode pieces and, in the first operation mode the transmission signals at the first level are supplied additionally to the electrode pieces of the second electrode to be transmitted therefrom to the position detector.

6. The position pointer of claim 1, wherein, in response to transitioning from the second operation mode to the first operation mode, the transmission signals supplied to the second electrode to be transmitted therefrom to the position detector change from being at the second level to being at the first level.

7. The position pointer of claim 1, wherein, in response to transitioning from the first operation mode to the second operation mode, the transmission signals supplied to the second electrode to be transmitted therefrom to the position detector change from being at the first level to being at the second level.

8. A position pointer, comprising:
a signal generation circuit arranged in a pen-shaped housing and configured to generate a first transmission signal at a first level and a second transmission signal at a second level which is greater than the first level;
a first electrode arranged to protrude from one end portion of the pen-shaped housing along an axial center direction and configured to be capacitively coupled with a sensor of a position detector;
a second electrode including electrode pieces that are equiangularly disposed about the axial center direction of the pen-shaped housing to surround the axial center direction and configured to be capacitively coupled with the sensor; and
a signal supply control circuit, which is coupled to the signal generation circuit and which:
in response to a first control signal transmitted from the position detector in a first operation mode, supplies the first transmission signal at the first level to the first electrode to be transmitted therefrom to the position detector, and
in response to a second control signal transmitted from the position detector in a second operation mode, supplies the second transmission signal at the second level to selected ones of the electrode pieces of the second electrode to be transmitted therefrom to the position detector.

9. The position pointer of claim 8, wherein the first operation mode is a position pointing mode and the second operation mode is a hovering mode.

10. The position pointer of claim 8, wherein, in the second operation mode the second transmission signal at the second level is intermittently supplied to the selected ones of the electrode pieces of the second electrode to be transmitted therefrom to the position detector.

11. The position pointer of claim 8, wherein, in the first operation mode the first transmission signal at the first level is supplied additionally to the second electrode to be transmitted therefrom to the position detector.

12. A position pointer, comprising:
a signal generation circuit arranged in a pen-shaped housing and configured to generate a first transmission signal at a first level and a second transmission signal at a second level which is greater than the first level;
a first electrode arranged to protrude from one end portion of the pen-shaped housing along an axial center direction and configured to be capacitively coupled with a sensor of a position detector;
a second electrode disposed off the axial center direction of the pen-shaped housing near the first electrode;
a control signal reception circuit configured to receive a control signal transmitted from the position detector, and
a signal supply control circuit, which is coupled to the signal generation circuit and which, in operation,
in response to the control signal indicating a transition from a second operation mode to a first operation mode of the position detector, supplies the first transmission signal at the first level to the first electrode to be transmitted therefrom to the position detector, and
in response to the control signal indicating a transition from the first operation mode to the second operation mode, supplies the second transmission signal at the second level to the second electrode to be transmitted therefrom to the position detector.

13. The position pointer of claim 12, wherein the control signal reception circuit, in operation, receives the control signal transmitted from the position detector through a Bluetooth wireless communication.

14. The position pointer of claim 12, wherein the control signal reception circuit, in operation, receives the control signal transmitted from the position detector through a capacitive coupling with the sensor.

15. The position pointer of claim 12, wherein the first operation mode is a position pointing mode and the second operation mode is a hovering mode.

16. The position pointer of claim 12, wherein, in the second operation mode the second transmission signal at the second level is intermittently supplied to the second electrode to be transmitted therefrom to the position detector.

17. The position pointer of claim 12, wherein, in the first operation mode the first transmission signal at the first level is supplied additionally to the second electrode to be transmitted therefrom to the position detector.

18. The position pointer of claim 12, wherein, the second electrode includes electrode pieces and, in the first operation mode the first transmission signal at the first level is supplied additionally to the electrode pieces of the second electrode to be transmitted therefrom to the position detector.

* * * * *